(12) United States Patent
Hoshinoya et al.

(10) Patent No.: US 9,193,258 B2
(45) Date of Patent: Nov. 24, 2015

(54) DRIVE DEVICE FOR VEHICLE

(71) Applicant: HONDA MOTOR CO., LTD., Tokyo (JP)

(72) Inventors: Takeshi Hoshinoya, Wako (JP); Keiichi Ooiso, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/034,559

(22) Filed: Sep. 24, 2013

(65) Prior Publication Data
US 2014/0096641 A1 Apr. 10, 2014

(30) Foreign Application Priority Data
Oct. 5, 2012 (JP) .................................. 2012-223567

(51) Int. Cl.
*B60K 11/02* (2006.01)
*B60K 1/02* (2006.01)
(Continued)

(52) U.S. Cl.
CPC . *B60K 11/02* (2013.01); *B60K 1/02* (2013.01); *B60L 3/0061* (2013.01); *B60L 11/123* (2013.01); *B60L 11/14* (2013.01); *B60L 11/1877* (2013.01); *B60L 15/2054* (2013.01); *F16H 57/045* (2013.01); *F16H 57/0476* (2013.01); *B60K 7/0007* (2013.01); *B60K 2001/003* (2013.01); *B60L 2220/16* (2013.01); *B60L 2220/46* (2013.01); *B60L 2240/12* (2013.01);
(Continued)

(58) Field of Classification Search
CPC ......... B60K 11/02; B60K 6/40; B60K 20/00; B60K 6/448; B60K 6/52; B60K 6/48; B60K 17/046; B60K 17/02; B60K 7/0007; H02K 7/006; H02K 9/19
USPC ............... 74/665 L, 661, 325, 335, 346, 605, 74/606 A; 475/5, 149, 151; 180/65.1, 180/65.21, 214, 215
See application file for complete search history.

(56) References Cited

U.S. PATENT DOCUMENTS 4,258,679 A * 3/1981 Leitermann ............. 123/196 AB
5,301,642 A * 4/1994 Matsushiro et al. .... 123/196 AB
(Continued)

FOREIGN PATENT DOCUMENTS

JP 11-218015 8/1999
JP 2010247657 * 4/2009 ............ B60K 11/02
(Continued)

OTHER PUBLICATIONS

Japanese Office Action for corresponding JP Application No. 2012-223567, Jun. 10, 2014.
(Continued)

*Primary Examiner* — Ha D Ho
*Assistant Examiner* — Jude Agendia
(74) *Attorney, Agent, or Firm* — Mori & Ward, LLP

(57) ABSTRACT

A drive device for a vehicle includes a first motor, a first case, a second motor, a second case, a right-and-left communication passage, and a sensor. The first case houses the first motor and has a left reservoir to store liquid fluid. The second case houses the second motor and has a right reservoir to store liquid fluid. The right-and-left communication passage communicates with the left reservoir and the right reservoir. The sensor is configured to detect a property of the liquid fluid and disposed in the right-and-left communication passage.

9 Claims, 15 Drawing Sheets

(51) Int. Cl.
  B60L 11/14 (2006.01)
  B60L 11/02 (2006.01)
  F16H 57/04 (2010.01)
  B60L 3/00 (2006.01)
  B60L 11/12 (2006.01)
  B60L 11/18 (2006.01)
  B60L 15/20 (2006.01)
  B60K 7/00 (2006.01)
  B60K 1/00 (2006.01)

(52) U.S. Cl.
  CPC ........ *B60L2240/36* (2013.01); *B60L 2240/421* (2013.01); *B60L 2240/425* (2013.01); *B60L 2240/486* (2013.01); *B60L 2260/28* (2013.01); *Y10T 74/19126* (2015.01)

(56) References Cited

U.S. PATENT DOCUMENTS

| | | | |
|---|---|---|---|
| 5,419,406 A * | 5/1995 | Kawamoto et al. | 180/65.6 |
| 6,321,865 B1 * | 11/2001 | Kuribayashi et al. | 180/243 |
| 6,401,870 B2 * | 6/2002 | Roy et al. | 184/6.26 |
| 7,002,267 B2 * | 2/2006 | Raszkowski et al. | 310/54 |
| 8,157,037 B2 * | 4/2012 | Reed et al. | 180/65.6 |
| 8,162,085 B2 * | 4/2012 | Burchett et al. | 180/65.275 |
| 8,632,434 B2 * | 1/2014 | Kira et al. | 475/151 |
| 2005/0037883 A1 * | 2/2005 | Motoike et al. | 475/5 |
| 2006/0223670 A1 * | 10/2006 | Nishikawa et al. | 477/168 |
| 2010/0041502 A1 * | 2/2010 | Nagamatsu | 475/5 |
| 2013/0178320 A1 * | 7/2013 | Suzuki et al. | 475/151 |
| 2013/0260956 A1 * | 10/2013 | Noguchi et al. | 477/3 |

FOREIGN PATENT DOCUMENTS

| | | |
|---|---|---|
| JP | 2010-247657 | 11/2010 |
| JP | 2010-249220 | 11/2010 |
| WO | 2012/026204 A1 | 3/2012 |
| WO | 2012/042983 A1 | 4/2012 |

OTHER PUBLICATIONS

Chinese Office Action for corresponding CN Application No. 201310463597.9, May 6, 2015.

* cited by examiner

DRIVE DEVICE FOR VEHICLE

CROSS-REFERENCE TO RELATED APPLICATIONS

The present application claims priority under 35 U.S.C. §119 to Japanese Patent Application No. 2012-223567, filed Oct. 5, 2012, entitled "Drive Device for Vehicle." The contents of this application are incorporated herein by reference in their entirety.

BACKGROUND

1. Field

The present disclosure relates a drive device for a vehicle.

2. Description of the Related Art

The electric vehicle described in Japanese Unexamined Patent Application Publication No. 2010-249220 includes as a conventional drive device for a vehicle: a pair of electric motors on the right and left; first and second oil temperature sensors which each output a signal corresponding to the temperatures of oil stored in an oil pan of corresponding one of the electric motors; and first and second oil level sensors which each output a signal corresponding to an oil level in an oil pan of corresponding one of the electric motors (see FIG. 7 in Japanese Unexamined Patent Application Publication No. 2010-249220).

SUMMARY

According to one aspect of the present invention, a drive device for a vehicle includes a first motor, a first case, a second motor, a second case, a right-and-left communication passage, and a sensor. The first motor is connected to a left wheel of the vehicle to drive the left wheel. The first case houses the first motor and has a left reservoir to store liquid fluid used for at least one of cooling of the first motor, lubrication of the first motor, cooling of a power transmission path between the first motor and the left wheel, and lubrication of the power transmission path between the first motor and the left wheel. The second motor is connected to a right wheel of the vehicle to drive the right wheel. The second case houses the second motor and has a right reservoir to store liquid fluid used for at least one of cooling of the second motor, lubrication of the second motor, cooling of a power transmission path between the second motor and the right wheel, and lubrication of the power transmission path between the second motor and the right wheel. The right-and-left communication passage communicates with the left reservoir and the right reservoir. The sensor is configured to detect a property of the liquid fluid and disposed in the right-and-left communication passage.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
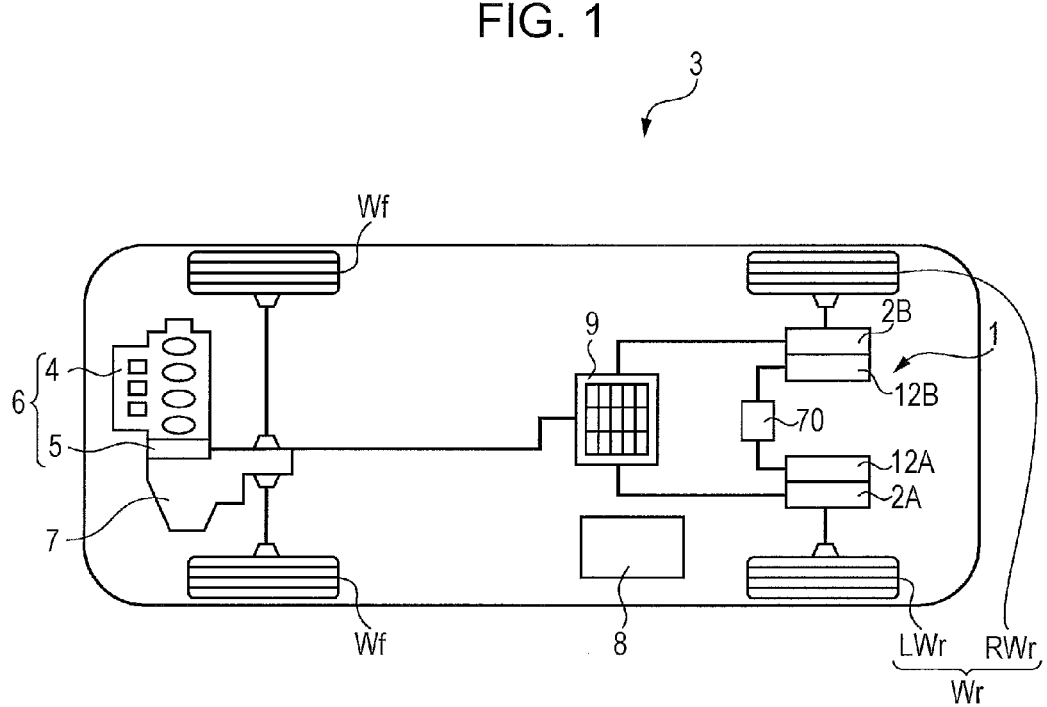
FIG. 1 is a block diagram illustrating a schematic configuration of a hybrid vehicle serving as an embodiment of a vehicle which can be equipped with a drive device for a vehicle according to the present disclosure.

The embodiments will now be described with reference to the accompanying drawings, wherein like reference numerals designate corresponding or identical elements throughout the various drawings.

A drive device for a vehicle according to the present disclosure has an electric motor as a drive source for driving wheels, and is used, for example, in a vehicle having a drive system as illustrated in FIG. 1. In the following description, a case will be described as an example where the drive device for a vehicle is used as a rear wheel drive device, however, the drive device for a vehicle may be used as a front wheel drive device. A vehicle 3 illustrated in FIG. 1 is a hybrid vehicle having a drive device 6 (hereinafter referred to as a front wheel drive device) at the front of the vehicle 3, the drive device 6 being formed by connecting an electric motor 5 and an internal combustion engine 4 in series. Power of the front wheel drive device 6 is transmitted to front wheels Wf via a transmission 7, whereas power of a drive device 1 (hereinafter referred to as a rear wheel drive device) is transmitted to rear wheels Wr (RWr, LWr), the drive device 1 being disposed in the rear of the vehicle 3 separately from the front wheel drive device 6. The electric motor 5 of the front wheel drive device 6, and first and second electric motors 2A, 2B of the rear wheel drive device 1 on the rear wheel Wr side are connected to a battery 9, thereby enabling electric power supply from the battery 9 and energy regeneration to the battery 9. In FIG. 1, a reference symbol 8 indicates a control device for controlling the entire vehicle 3.

Figure 2:
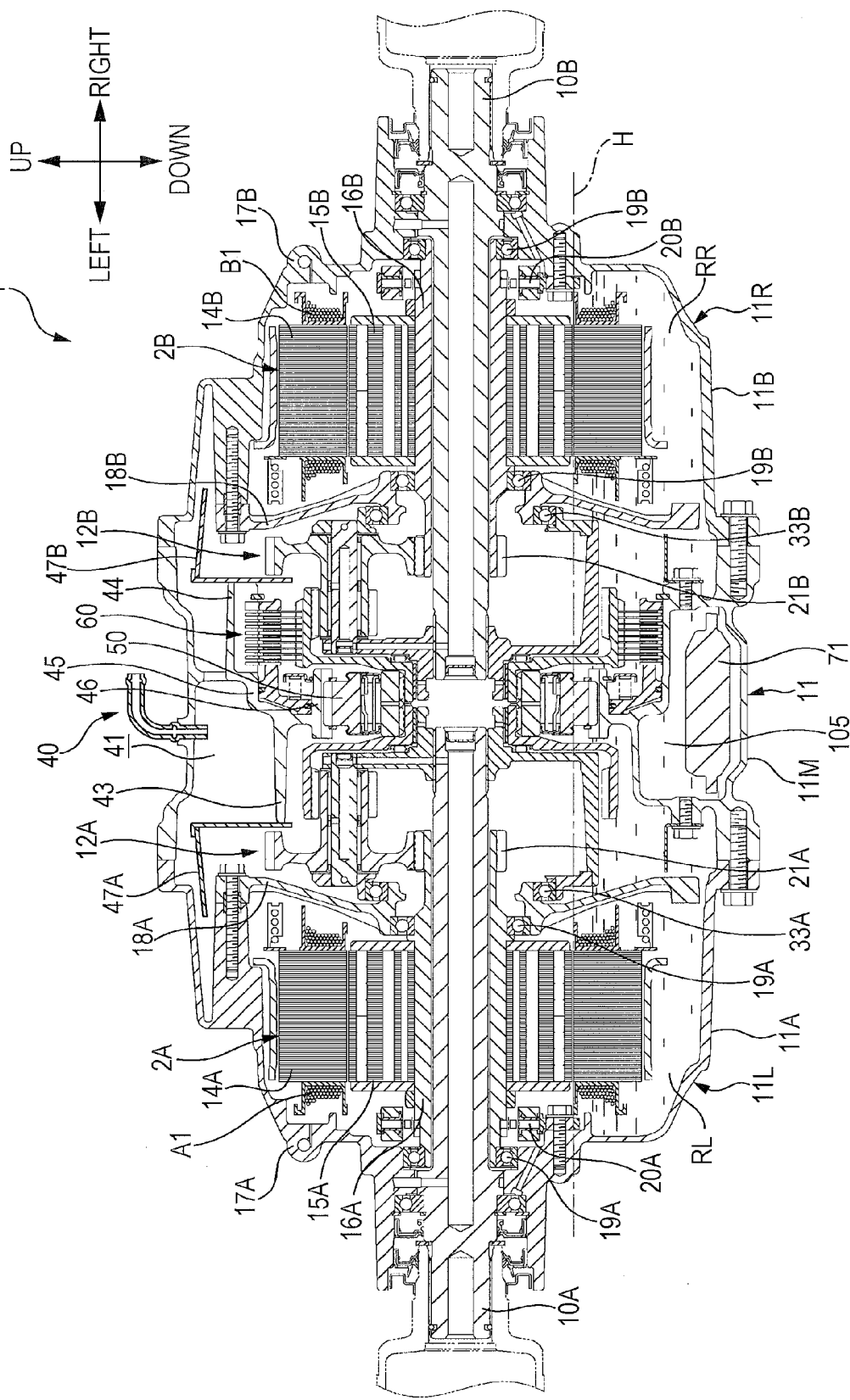
FIG. 2 is a vertical cross-sectional view of a rear wheel drive device in the embodiment, taken along line II-II illustrated in FIG. 10.
Figure 3:
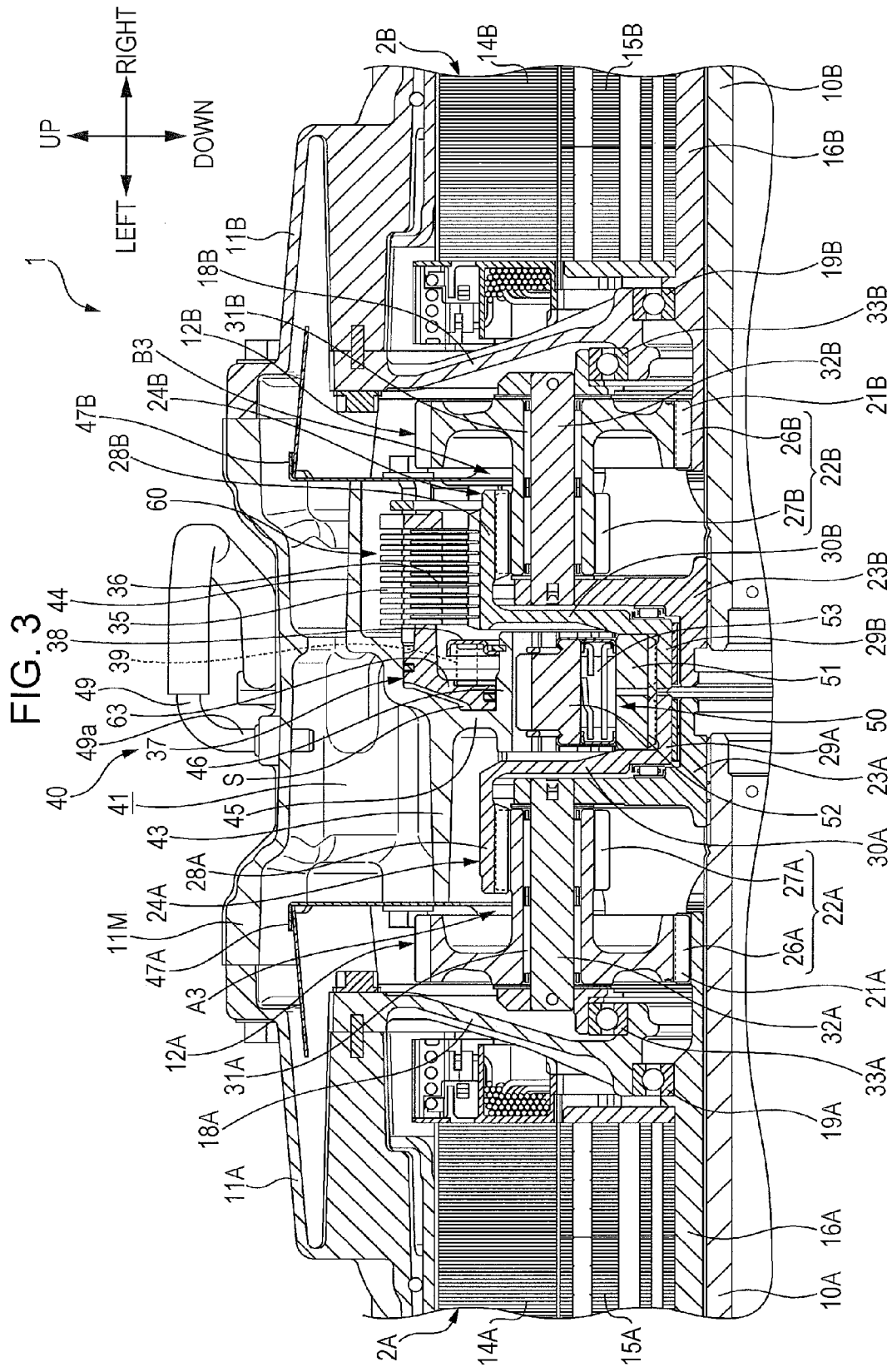
FIG. 3 is an enlarged cross-sectional view of an upper part of a rear wheel drive device illustrated in FIG. 2.

First, a drive device for a vehicle in an embodiment according to the present disclosure will be described with reference to FIGS. 2 to 15. FIG. 2 is a vertical cross-sectional view of the entire rear wheel drive device 1, and FIG. 3 is an enlarged cross-sectional view of an upper part of the rear wheel drive device 1 of FIG. 2. In FIGS. 2 and 3, a reference symbol 11 indicates the case of the rear wheel drive device 1, and the case 11 includes a central case 11M disposed in approximately the middle in a vehicle width direction; and side cases 11A, 11B disposed on the right and left of the central case 11M so as to interpose the central case 11M. The entire case 11 is formed in a substantially cylindrical shape. Inside the case 11, axles 10A, 10B for the rear wheels Wr, first and second electric motors 2A, 2B for driving the axles, and first and second planetary gear speed reducers 12A, 12B for reducing the drive rotation of the first and second electric motors 2A, 2B are arranged on the same axis. The axle 10A, the first electric motor 2A, and the first planetary gear speed reducer 12A control the drive of the left rear wheel LWr, whereas the axle 10B, the second electric motor 2B, and the second planetary gear speed reducer 12B control the drive of the right rear wheel RWr. The axle 10A, the first electric motor 2A, the first planetary gear speed reducer 12A, and the axle 10B, the second electric motor 2B, the second planetary gear speed reducer 12B are arranged symmetrically to the center of the vehicle width in the case 11. The left rear wheel LWr and the first planetary gear speed reducer 12A are located on the opposite sides of the first electric motor 2A, and the right rear wheel RWr and the second planetary gear speed reducer 12B are located on the opposite sides of the second electric motor 2B.

Figure 4:
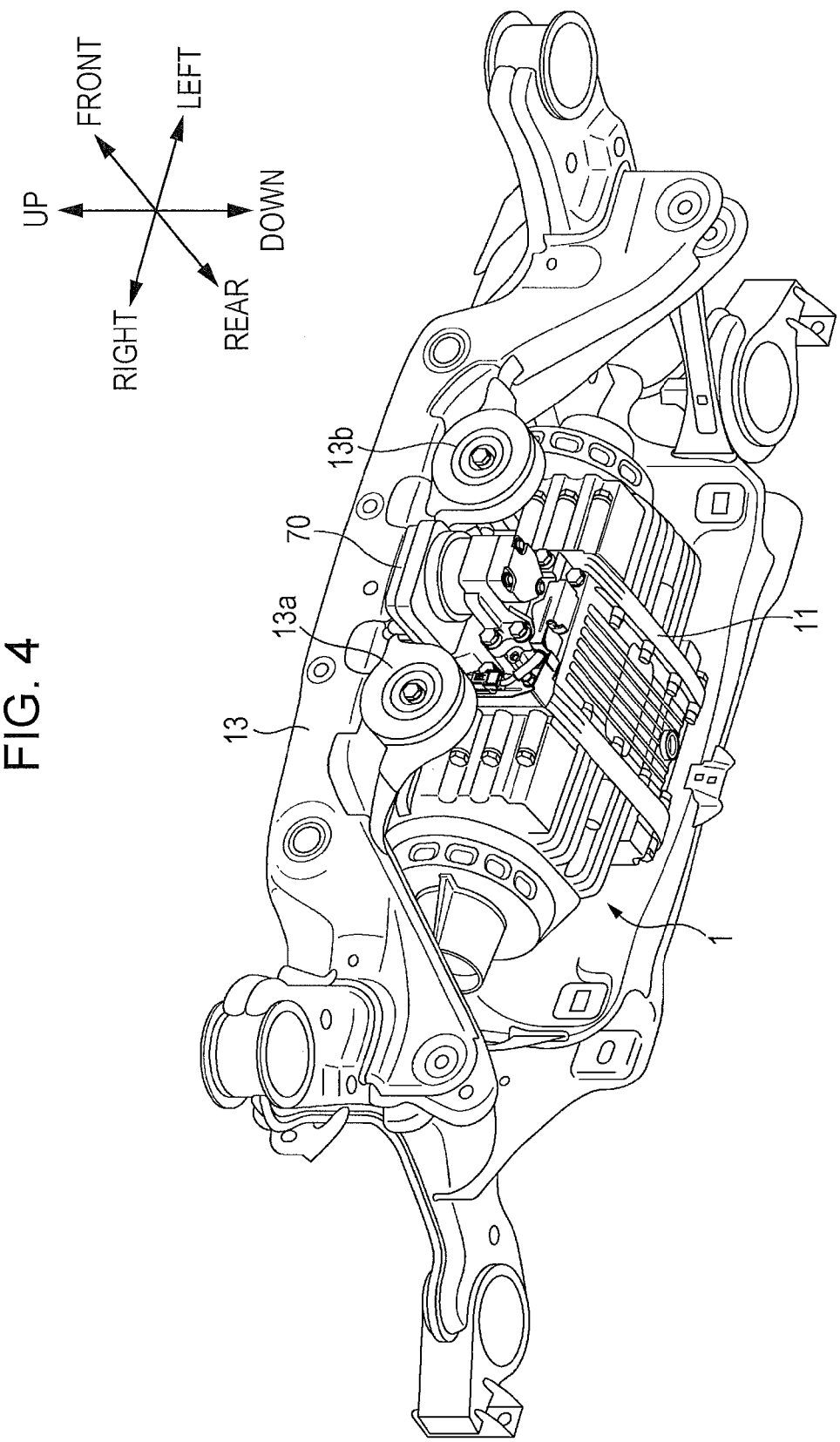
FIG. 4 is a perspective view illustrating the manner how the drive device for a vehicle of FIG. 1 is mounted in a frame.

Partition walls 18A, 18B extending radially inwardly are disposed on respective sides of the lateral cases 11A, 11B that face the central case 11M, and the first and second electric motors 2A, 2B are disposed between the lateral cases 11A, 11B and the partition walls 18A, 18B, respectively. The first and second planetary gear speed reducers 12A, 12B are disposed in the space surrounded by the central case 11M and the partition walls 18A, 18B. As illustrated in FIG. 2, in the present embodiment, the left lateral case 11A and the central case 11M constitute a first case 11L which houses the first electric motor 2A and the first planetary gear speed reducer 12A, and the right lateral case 11B and the central case 11M constitute a second case 11R which houses the second electric motor 2B and the second planetary gear speed reducer 12B. The first case 11L has a left reservoir RL which stores oil as liquid fluid to be provided for lubricating and/or cooling at least one of the first electric motor 2A and a power transmission path, and the second case 11R has a right reservoir RR which stores oil to be provided for lubricating and/or cooling at least one of the second electric motor 2B and the power transmission path. The left reservoir RL and the right reservoir RR are arranged in the vehicle width direction, and communicate with each other via a left communication passage 107, a strainer housing chamber 105 described later, and a right communication passage (not illustrated). As illustrated in FIG. 4, the case 11 is supported by supports 13a, 13b of a frame member 13 and a frame (not illustrated) of the drive device 1, the frame member 13 serving as a part of the framework of the vehicle 3. The supports 13a, 13b are provided on the right and left of the center of the frame member 13 in the vehicle width direction. The arrows in FIG. 4 indicate positional relationship with the rear wheel drive device 1 mounted on the vehicle.

The rear-wheel drive device 1 is provided with a breather device 40 which communicates with the inside and the outside of the case 11 so that the internal air can escape via a breather chamber 41 in order to prevent the internal air from becoming excessively high in temperature and pressure. The breather chamber 41 is disposed vertically above the case 11, and is composed of the space that is formed by the outer wall of the central case 11M, a first cylindrical wall 43 which extends toward the left lateral case 11A in a substantially horizontal direction in the central case 11M, a second cylindrical wall 44 which extends toward the right lateral case 11B in a substantially horizontal direction in the central case 11M, a right-and-left dividing wall 45 which connects the inner ends of the first and second cylindrical walls 43, 44, a baffle plate 47A which is installed to come into contact with the distal end of the left lateral case 11A of the first cylindrical wall 43, and a baffle plate 47B which is installed to come into contact with the distal end of the right lateral case 11B of the second cylindrical wall 44.

The first and second cylindrical walls 43, 44, and the right-and-left dividing wall 45 which constitute the lower surface of the breather chamber 41 are formed so that the first cylindrical wall 43 is located radially inwardly of the second cylindrical wall 44, and the right-and-left dividing wall 45 extends from the inner end of the second cylindrical wall 44 to the inner end of the first cylindrical wall 43 while bending to reduce the size in the radial direction. The right-and-left dividing wall 45 further extends radially inwardly and reaches a third cylindrical wall 46 which extends in a substantially horizontal direction. The third cylindrical wall 46 is located at substantially the center of both outer ends of the first cylindrical wall 43 and the second cylindrical wall 44.

In the central case 11M, the baffle plates 47A, 47B are fixed so as to partition the space between the first cylindrical wall 43 and the outer wall of the central case 11M, and the space between the second cylindrical wall 44 and the outer wall of the central case 11M in order to separate the first planetary gear speed reducer 12A and the second planetary gear speed reducer 12B, respectively.

In addition, in the central case 11M, an external communication path 49 which communicates between the breather chamber 41 and the outside, and is connected to the upper surface of the breather chamber 41 in the vertical direction. A breather chamber side end 49a of the external communication passage 49 is disposed projecting in the lower vertical direction. Consequently, oil is prevented from being discharged to the outside through the external communication passage 49.

In the first and second electric motors 2A, 2B, stators 14A, 14B are respectively fixed to the lateral cases 11A, 11B, and ring-shaped rotors 15A, 15B are rotatably disposed within the inner circumference of the stators 14A, 14B. In the inner circumference of the rotors 15A, 15B, cylindrical shafts 16A, 16B, which respectively surround the outer circumference of the axles 10A, 10B, are secured thereto, and are supported via bearings 19A, 19B on end walls 17A, 17B and the partition walls 18A, 18B of the lateral cases 11A, 11B, respectively, so that the cylindrical shafts 16A, 16B are rotatable relative to the axles 10A, 10B on the same axis. In the end walls 17A, 17B on the outer circumference of one end side of the cylinder shafts 16A, 16B, resolvers 20A and 20B are provided for feeding back rotational position information of the rotors 15A, 15B to controllers (not illustrated) of the first and second electric motors 2A, 2B. The first and second electric motors 2A, 2B which include the stators 14A, 14B and the rotors 15A, 15B have the same radius, and are disposed in mirror symmetry. The axle 10A and the cylindrical shaft 16A are through the first electric motor 2A, and extend from both ends of the first electric motor 2A; the axle 10B and the cylindrical shaft 16B are also through the second electric motor 2B, and extend from both ends of the second electric motor 2B.

The first and second planetary gear speed reducers 12A, 12B respectively include sun gears 21A, 21B; ring gears 24A, 24B located on the outer circumference of the sun gears 21A, 21B; a plurality of planetary gears 22A, 22B engaged with the sun gears 21A, 21B and the ring gears 24A, 24B; and planetary carriers 23A, 23B for supporting the planetary gears 22A, 22B, whereby the driving forces of the first and second electric motors 2A, 2B are inputted via the sun gears 21A, 21B, respectively, and reduced driving forces are outputted to the axles 10A, 10B via the planetary carriers 23A, 23B.

The sun gears 21A, 21B are formed integrally with the cylindrical shafts 16A, 16B. The planetary gears 22A, 22B are each twin pinion having first major-diameter pinions 26A, 26B which are directly engaged with the sun gears 21A, 21B, and second pinions 27A, 27B having a diameter smaller than that of the first pinions 26A, 26B. The first pinions 26A, 26B and the second pinions 27A, 27B are integrally formed on the same axis with an offset in the axis direction. The planetary gears 22A, 22B are supported by pinion shafts 32A, 32B of the planetary carriers 23A, 23B via needle bearings 31A, 31B, respectively. The axial inner ends of the planetary carriers 23A, 23B extend radially inwardly to be spline-fitted to and supported by the axles 10A, 10B in an integrally rotatable manner, and are supported by the partition walls 18A, 18B via bearings 33A, 33B.

The ring gears 24A, 24B include gears portions 28A, 28B, the inner circumferential surfaces of which are engaged with the minor-diameter second pinions 27A, 27B; minor-diameter gear portions 29A, 29B which each have a diameter smaller than that of the gears portions 28A, 28B, and are disposed to face each other in the middle position of the case 11; and coupling portions 30A, 30B which respectively radially couple the axially inner ends of the gears portions 28A, 28B to the axially outer ends of the minor-diameter gear portions 29A, 29B.

The gear portions 28A, 28B are axially opposed to each other with respect to a third cylindrical wall 46, which is formed at the inner diameter end of the right-and-left dividing wall 45 of the central case 11M. The outer circumferential surfaces of the minor-diameter gear portions 29A, 29B are each spline-fitted to an inner race 51 of the below-described one-way clutch 50, and the ring gears 24A, 24B are connected to the inner race 51 of the one-way clutch 50 so as to rotate integrally therewith.

A hydraulic brake 60 which serves as a braking device for the ring gear 24B is disposed between the second cylindrical wall 44 of the central case 11M included in the case 11, and the gear portion 28B of the ring gear 24B on the side of the second planetary gear speed reducer 12B so that the hydraulic brake 60 radially overlaps with the first pinion 26B, and axially overlaps with the second pinion 27B. In the hydraulic brake 60, a plurality of fixed plates 35 which are spline-fitted to the inner circumferential surface of the second cylindrical wall 44, and a plurality of rotary plates 36 which are spline-fitted to the outer circumferential surface of the gear portion 28B of the ring gear 24B are alternately disposed in the axis direction so that an engaging or releasing operation is performed on the plates 35, 36 by a ring-shaped piston 37. The piston 37 is retractably housed in a ring-shaped cylinder chamber which is formed between the right-and-left dividing wall 45 of the central case 11M and the third cylindrical wall 46, and is further constantly urged by an elastic member 39 in a direction such that the fixed plates 35 and the rotary plates 36 are released, the elastic member 39 being supported by a receiving member 38 which is provided on the outer circumferential surface of the third cylindrical wall 46.

More particularly, between the right-and-left dividing wall 45 and the piston 37, there is formed an operating chamber S into which oil is directly introduced, and when the pressure of the oil introduced into the operating chamber S exceeds the urging force of the elastic member 39, the piston 37 moves forward (moves to the right) so that the fixed plates 35 and the rotary plates 36 are pressed each other and then engaged. On the other hand, when the urging force of the elastic member 39 exceeds the pressure of the oil introduced into the operating chamber S, the piston 37 moves backward (moves to the left) so that the fixed plates 35 and the rotary plates 36 are separated from each other and then released. The hydraulic brake 60 is connected to an electric oil pump 70 (see FIG. 4 and others) which serves as the liquid fluid supply device.

In the case of the hydraulic brake 60, the fixed plates 35 are supported by the second cylindrical wall 44 extending from the right-and-left dividing wall 45 of the central case 11M which constitutes the case 11, while the rotary plates 36 are supported by the gear portion 28B of the ring gear 24B. Therefore, when both plates 35, 36 are pressed each other by the piston 37, frictional engagement between the plates 35, 36 causes braking force to be applied to the ring gear 24B which is then fixed. In the above state, when the engagement caused by the piston 37 is released, the ring gear 24B is allowed to rotate freely. As described above, the ring gears 24A, 24B are connected to each other, and thus engagement of the hydraulic brake 60 also causes braking force to be applied to the ring gear 24A, and release of the hydraulic brake 60 also allows the ring gear 24A to rotate freely.

A space is also ensured between the coupling portions 30A, 30B of the ring gears 24A, 24B which are axially opposed to each other, and in the space, the one-way clutch 50 is disposed which allows power to be transmitted to the ring gears 24A, 24B only in one direction, but prevents power transmission in the other direction. The one-way clutch 50 is a clutch in which a great number of sprags 53 are interposed between the inner race 51 and an outer race 52, and has a configuration such that the inner race 51 rotates integrally with the minor-diameter gear portions 29A, 29B of the ring gears 24A, 24B by spline fitting. The outer race 52 is positioned and whirl-stopped by the third cylindrical wall 46.

The one-way clutch 50 is configured to engage and lock rotation of the ring gears 24A, 24B when the vehicle 3 moves forward under the power of the first and second electric motors 2A, 2B. More specifically, when forward-direction (rotation direction as the vehicle 3 moves forward) rotational power of the first and second electric motors 2A, 2B is inputted to the rear wheels Wr, the one-way clutch 50 is set in an engaged state, whereas when reverse-direction rotational power of the first and second electric motors 2A, 2B is inputted to the rear wheels Wr, the one-way clutch 50 is set in a disengaged state. When forward-direction rotational power of the rear wheels Wr is inputted to the first and second electric motors 2A, 2B, the one-way clutch 50 is set in a disengaged state, whereas when reverse-direction rotational power of the rear wheels Wr is inputted to the first and second electric motors 2A, 2B, the one-way clutch 50 is set in an engaged state.

Thus, the rear-wheel drive device 1 in the present embodiment, the one-way clutch 50 and the hydraulic brake 60 are provided side by side on the power transmission path between the first and second electric motors 2A, 2B, and the rear wheels Wr. The hydraulic brake 60 is controlled in a released or engaged state by the pressure of the oil supplied from the electric oil pump 70 in accordance with a running state of the vehicle and a disengaged state, a partially engaged state, or an engaged state of the one-way clutch 50. For example, when the vehicle 3 moves forward by driving power of the first and second electric motors 2A, 2B (at the time of low vehicle speed or medium vehicle speed), the one-way clutch 50 engages and is set in a state which allows power transmission. However, the hydraulic brake 60 is controlled to be in a partially engaged state, and thus input of forward-direction rotational power from the first and second electric motors 2A, 2B is temporarily reduced, and even when the one-way clutch 50 is set in a disengaged state, power transmission between the first and second electric motors 2A, 2B and the rear wheels Wr is still possible. When the vehicle 3 moves forward by driving power of the internal combustion engine 4 and/or the electric motor 5 (at the time of high vehicle speed), the one-way clutch 50 is disengaged and the hydraulic brake is further controlled in a released state, and thus excessive rotation of the first and second electric motors 2A, 2B is prevented. On the other hand, when the vehicle 3 moves backward or power regeneration is performed, the one-way clutch 50 is disengaged, and thus by controlling the hydraulic brake 60 in an engaged state, reverse-direction rotational power of the first and second electric motors 2A, 2B is outputted to the rear wheels Wr, or forward-direction rotational power of the rear wheels Wr is inputted to the first and second electric motors 2A, 2B.

Figure 5:
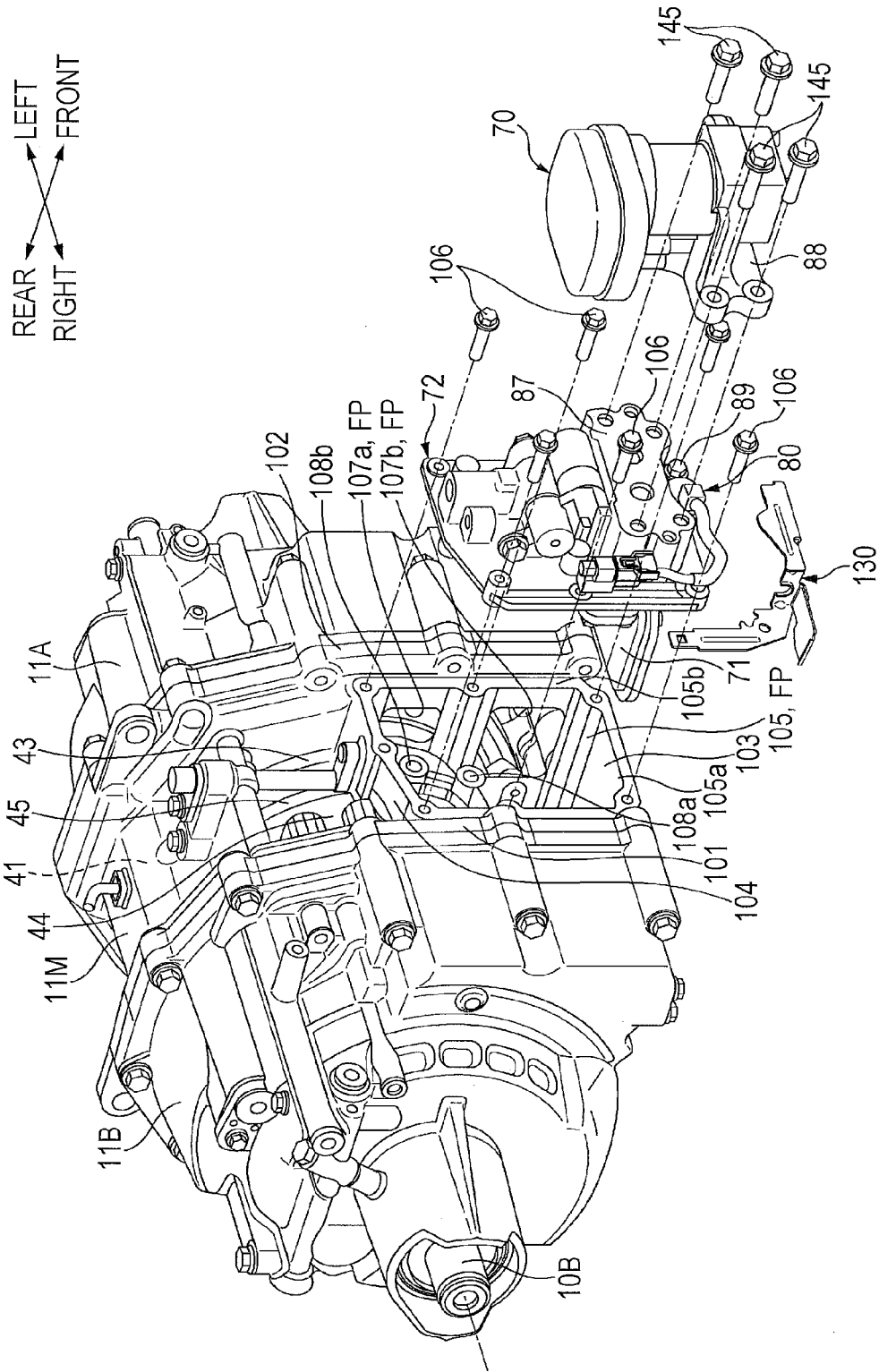
FIG. 5 is an exploded perspective view of a rear wheel drive device with an electrical oil pump removed.
Figure 9:
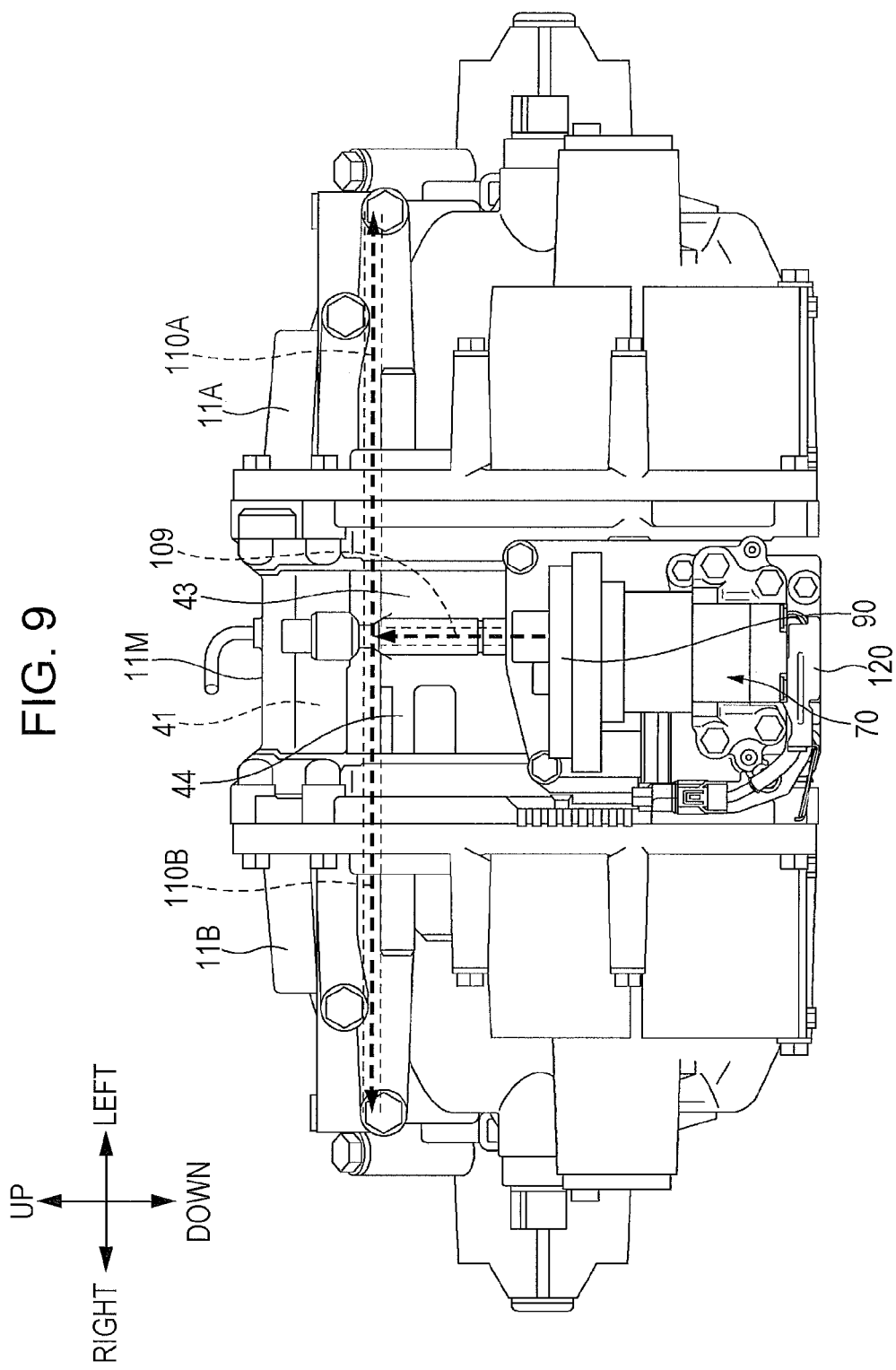
FIG. 9 is a front view of the rear wheel drive device schematically illustrating a flow of oil.

As illustrated in FIGS. 5 and 9, the outer circumferential surface of the first and second cylindrical walls 43, 44, and the right-and-left dividing wall 45 in the central case 11M are exposed to the outside except where the breather chamber 41 is formed. On the outer circumferential surface of the first and second cylindrical walls 43, 44, and the right-and-left dividing wall 45, a pair of projection portions 101,102, which project radially from axial both ends of the outer circumferential surface, are formed.

At a position inclined forward and downward from the first and second cylindrical walls 43, 44, and the right-and-left dividing wall 45, a strainer housing chamber 105, which houses the below-described strainer 71 in a substantially rectangular prism shape, is formed by the outer circumferential surface of the first and second cylindrical walls 43, 44, and the right-and-left dividing wall 45, a rear wall 100 (see FIG. 11) which is formed under the outer circumferential surface, a bottom wall 103 which extends forward from the lower end of the rear wall 100, an upper wall 104 which extends forward from a middle portion of the outer circumferential, and the pair of projection portions 101,102. The end surface of the pair of projection portions 101,102, the bottom wall 103, and the upper wall 104 which are included in the strainer housing chamber 105 constitutes a lid member fixing portion 105b, and forms the outer edge of a front opening 105a which is open forward in a horizontal direction of the central case 11M toward the outside. When the front opening 105a is closed by a lid member 72 on which the electric oil pump 70 is mounted, and oil is filled therein, an oil surface height (symbol H in FIG. 2) is achieved such that the lower ends of the rotors 15A, 15B of the first and second electric motors 2A, 2B do not sink below the oil surface height. The approximately lower half of the strainer housing chamber 105 then serves as a reservoir which is filled with oil. That is to say, the front opening 105a is formed at a position which overlaps with the reservoir of the strainer housing chamber 105, and the lid member 72 forms the wall surface of the reservoir.

In the pair of projection portions 101,102 which form the strainer housing chamber 105, there are formed through holes 107a, 107b which communicate with the left reservoir RL and the strainer housing chamber 105 as the left communication passage, and two through holes (not illustrated) which communicate with the right reservoir RR and the strainer housing chamber 105 as the right communication passage. Thus, the left reservoir RL and the right reservoir RR communicate with each other via a first right-and-left communication passage FP which is formed by the through holes 107a, 107b serving as the left communication passage, the strainer housing chamber 105, and two through holes (not illustrated) corresponding to the through holes 107a, 107b and serving as the right communication passage.

In the rear wall 100 below, there is formed a drain passage 111 which is through in the fore-and-aft direction and has one end facing the strainer housing chamber 105. The other rear end of the drain passage 111 forms a drain port which discharges oil to the outside (not illustrated). The drain port is closed with a drain bolt (not illustrated), and the oil is discharged to the outside by removing the drain bolt. In the rear wall 100 below, a second right-and-left communication passage SP is formed which is through in the vehicle width direction, intersecting the drain passage 111, and communicates with the left reservoir RL and the right reservoir RR. Thus, the second right-and-left communication passage SP is formed parallel to the first right-and-left communication passage FP which is formed including the strainer chamber houses 105.

Figure 6:
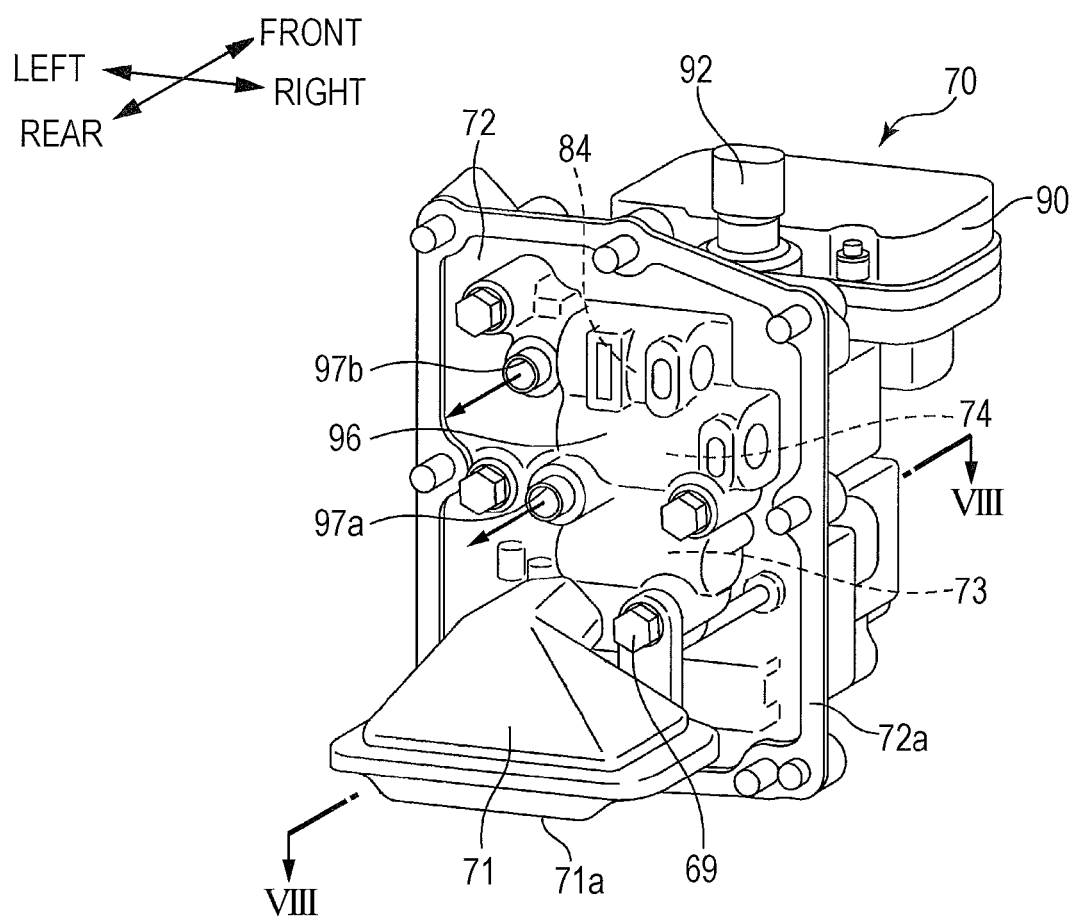
FIG. 6 is a perspective view from the inside of a lid member with the electrical oil pump and a strainer mounted.
Figure 7:
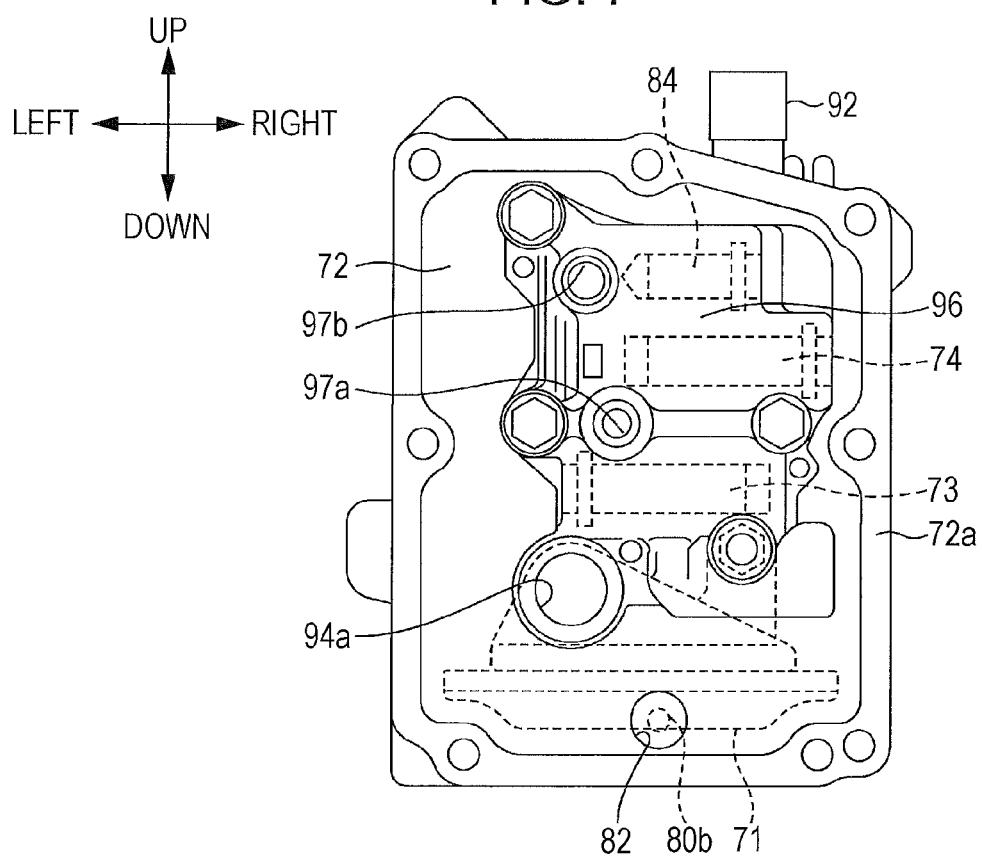
FIG. 7 is a view from the inside of the lid member with the strainer removed.

As illustrated in FIGS. 6 and 7, the lid member 72 included in the case 11 is provided with a case fixing portion 72a having an end face in a substantially rectangular shape so as to correspond to the lid member fixing portion 105b. The lid member 72 is provided with a strainer insertion hole 94a for inserting the below-described strainer 71 inwardly of the case fixing portion 72a, and a sensor insertion hole 82 for inserting the oil sensor 80 which detects an oil temperature, whereby the inside and the outside are communicated with each other. The sensor insertion hole 82 is formed in approximately the middle of the lid member 72 in the vehicle width direction, and thus the oil sensor 80 inserted in the sensor insertion hole 82 is disposed in approximately the middle of the first right-and-left communication passage FP in the vehicle width direction.

Figure 8:
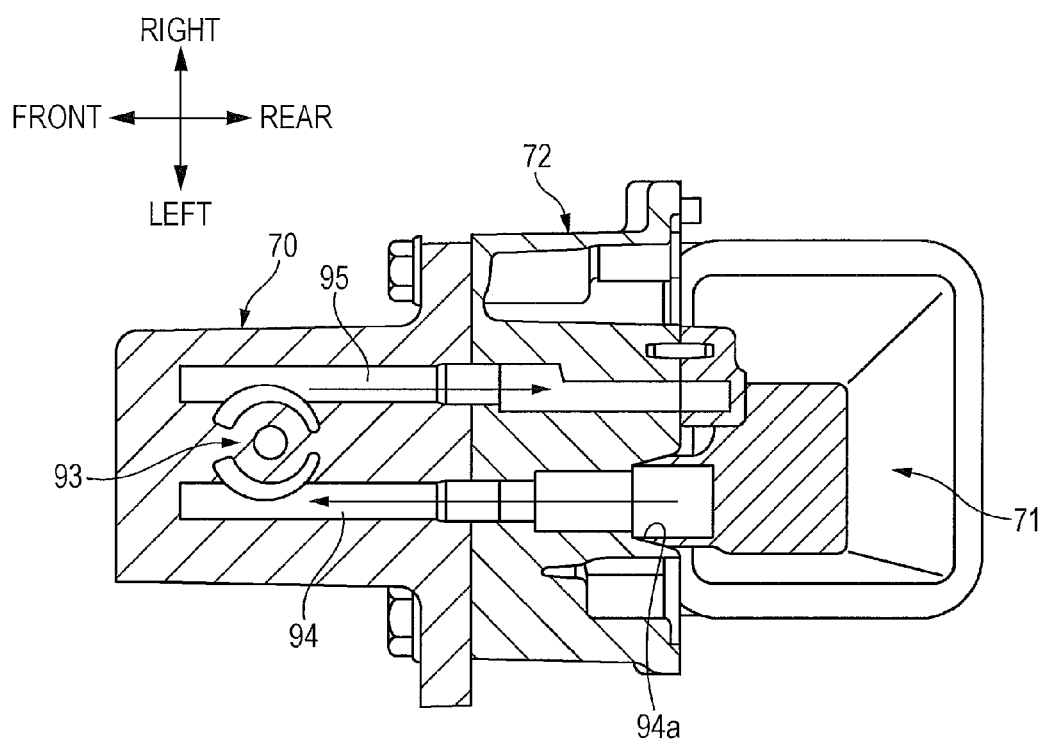
FIG. 8 is a cross-sectional view of the electrical oil pump, taken along line VIII-VIII of FIG. 6.

The strainer 71 is inserted into the strainer insertion hole 94a of the lid member 72 from the inside (rear side), and the below-described oil passage formation cover 96 is secured by a bolt 69 by which the lid member 72 is also secured. Consequently, the strainer 71 is detachably fixed to the lid member 72 only. The strainer 71 includes a filter medium (not illustrated), and foreign substances of oil are removed, the oil being sucked through the inlet port 71a which is provided at the lower surface of the filter medium. The oil with foreign substances removed is sent to the electric oil pump 70. That is to say, an inside fluid passage is formed by the strainer 71 which is fixed to the lid member 72, the inside fluid passage referring to part of an oil suction passage 94 that is from the strainer insertion hole 94a to the inlet port 71a out of the oil suction passage 94 which extends through the inside and the outside of the case 11 in order to supply oil to the electric oil pump 70. The strainer 71 included in the oil suction passage 94, in addition to the electric oil pump 70 and the lid member 72 extends inwardly of the case fixing portion 72a of the lid member 72, and the inlet port 71a of the strainer 71 is located in the reservoir of the strainer housing chamber 105 included in the first right-and-left communication passage FP in a mounted state where the lid member 72 is fixed to the case 11. As illustrated in FIG. 8, an oil discharge passage 95 is formed in parallel to the oil suction passage 94 in the electric oil pump 70 and the lid member 72, the oil discharge passage 95 being configured to supply oil from the electric oil pump 70 to the first and second electric motors 2A, 2B, and the first and second planetary gear speed reducers 12A, 12B.

Figure 11:
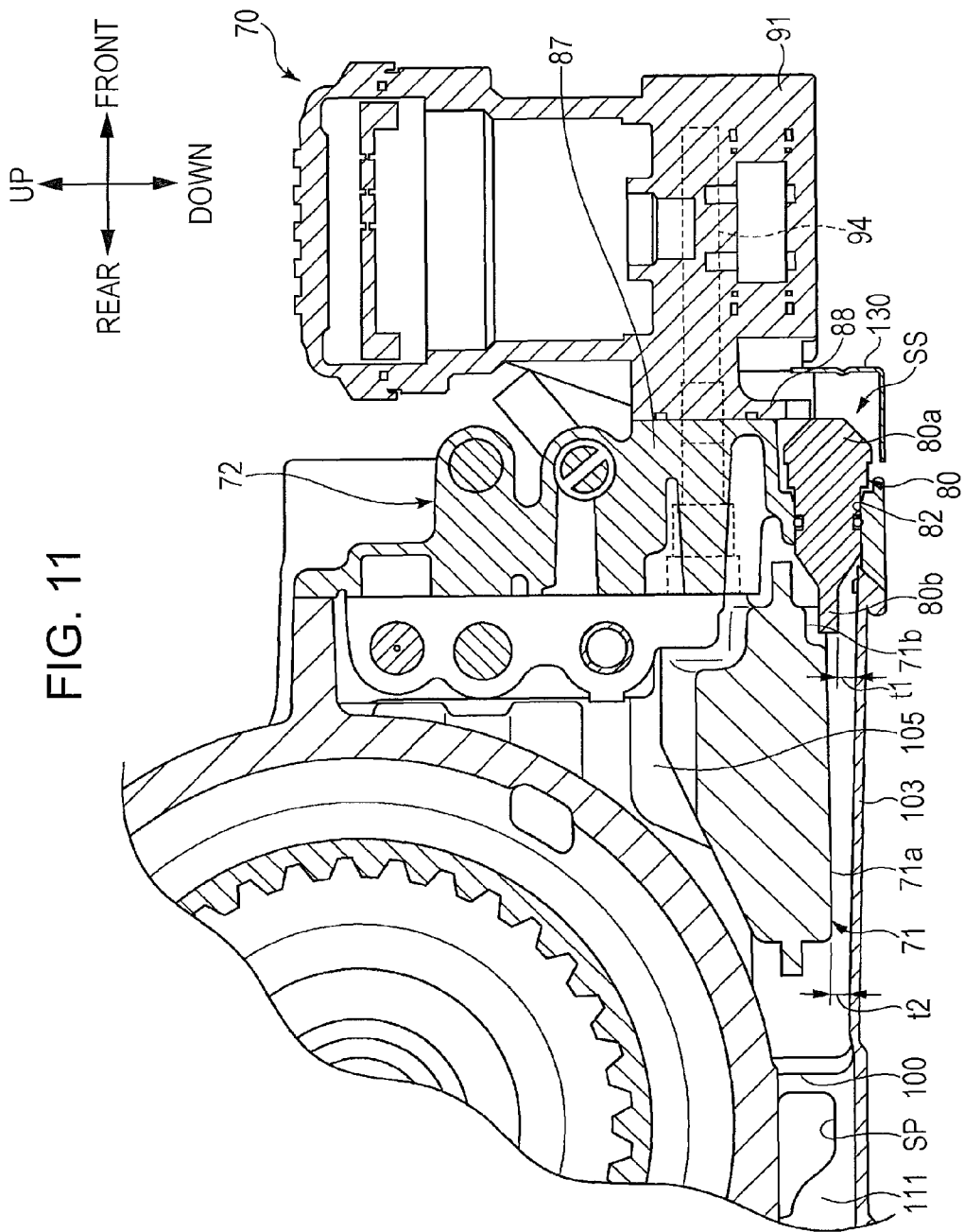
FIG. 11 is a partial cross-sectional view of the rear wheel drive device, taken along a vertical plane through an oil sensor.
Figure 12A:
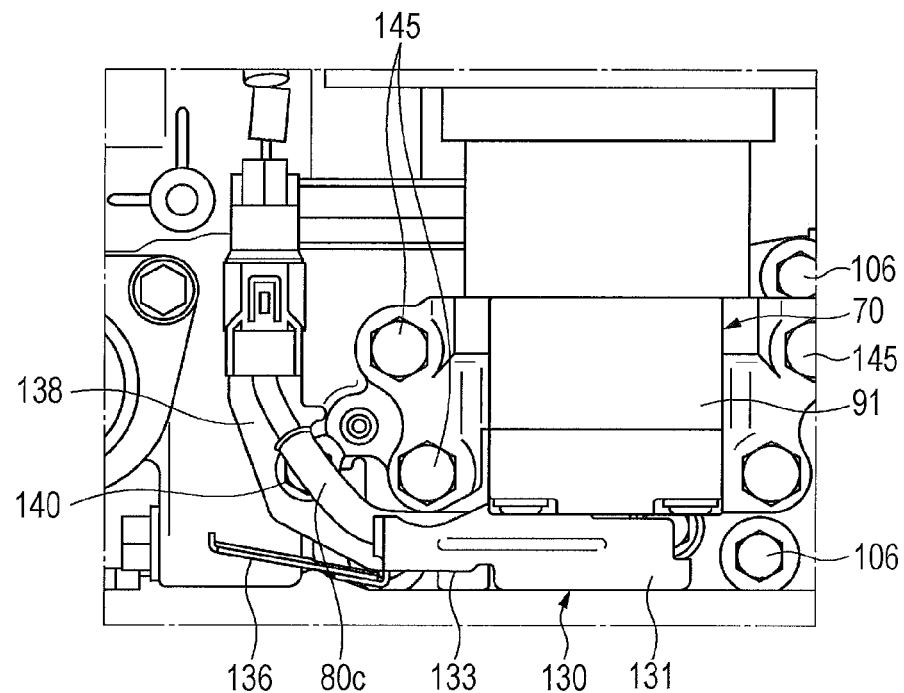
FIG. 12A is a front view of a vicinity of the oil sensor with a sensor cover mounted.
Figure 12B:
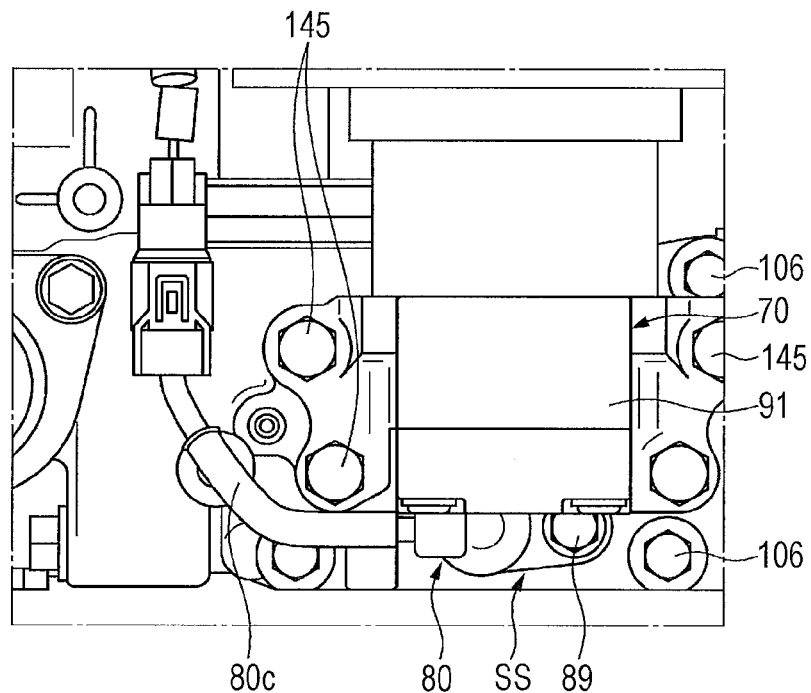
FIG. 12B is a front view of the vicinity of the oil sensor with the sensor cover removed.
Figure 13A:
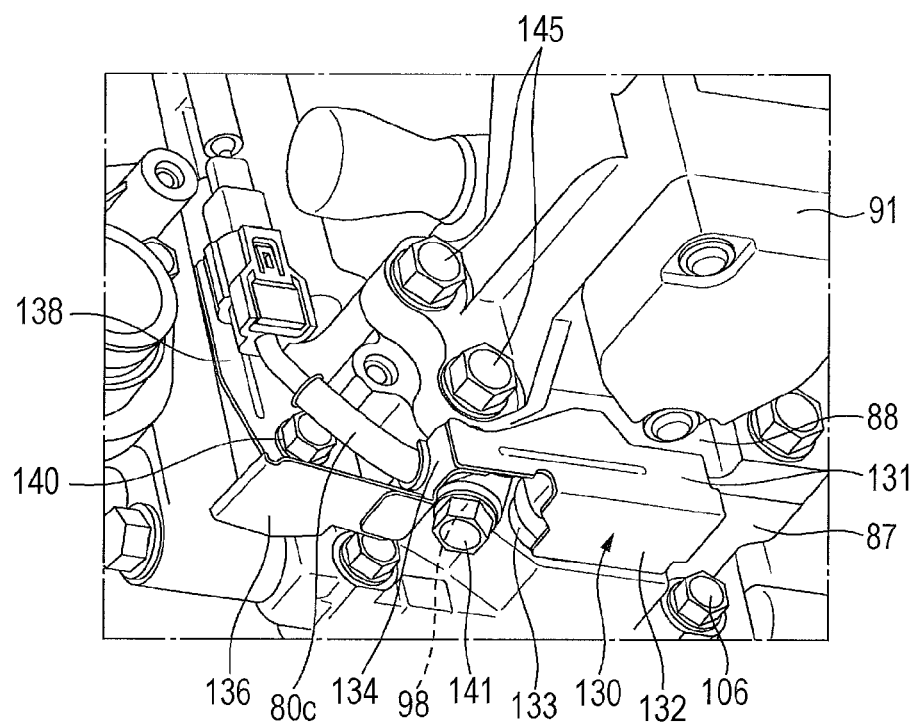
FIG. 13A is a perspective view of a vicinity of the oil sensor with the sensor cover mounted.
Figure 13B:
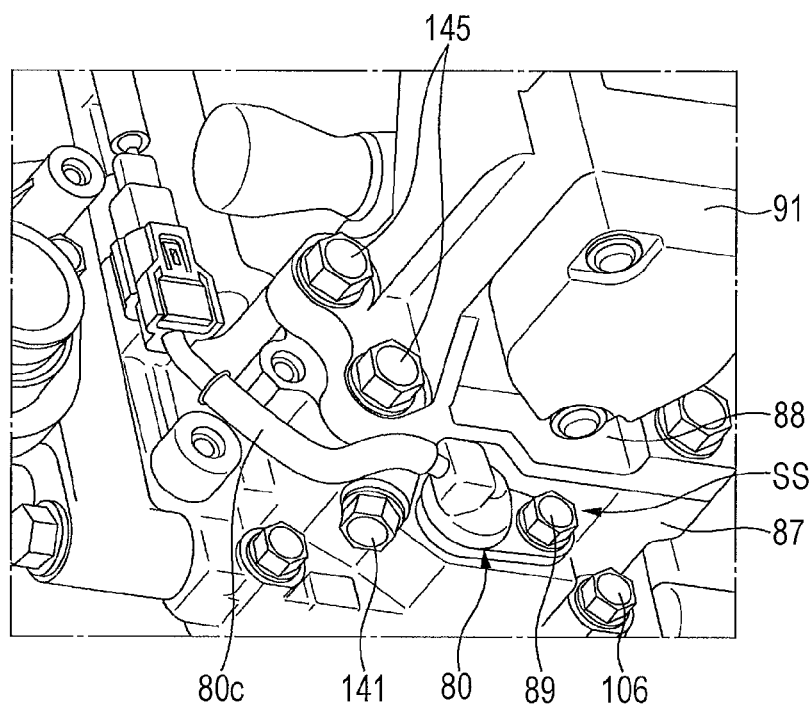
FIG. 13B is a perspective view of the vicinity of the oil sensor with the sensor cover removed.
Figure 14:
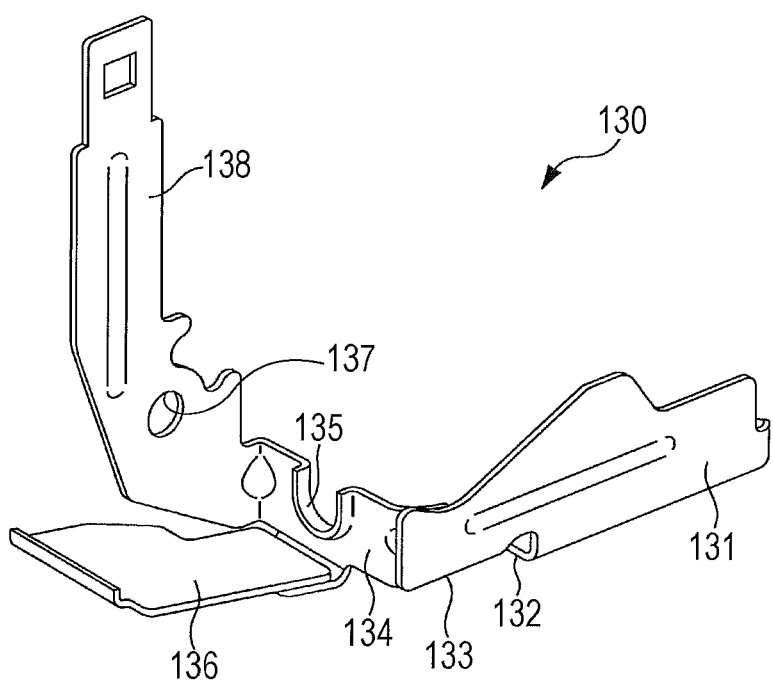
FIG. 14 is a perspective view of the sensor cover.

On the outer side of the lid member 72, a sensor accommodation space SS is reliably provided under the oil suction passage 94 and the oil discharge passage 95, the sensor accommodation space SS being rearwardly dented in a U shape (see FIGS. 11 to 13). In other words, a pedestal part 87 is formed so as to extend from an upper position of the sensor insertion hole 82 of the lid member 72 toward the electric oil pump 70. The pedestal part 87 is in contact with and fixed to a flange 88 of the electric oil pump 70. In the sensor accommodation space SS, the oil sensor 80 for detecting an oil temperature is fixed to the lid member 72 with a bolt 89 from the outer (front) side, a sensor base 80a of the oil sensor 80 is exposed to the outside from the lid member 72, and a temperature detector 80b positioned at the end side is located in the strainer housing chamber 105 through the sensor insertion hole 82. That is to say, the oil sensor 80 is disposed in the reservoir of the strainer housing chamber 105 included in the first right-and-left communication passage FP.

As illustrated in FIG. 11, the temperature detector 80b of the oil sensor 80 located in the strainer housing chamber 105 is under the strainer 71, partially located in a recess 71b, and is disposed close to the inlet port 71a provided in the lower surface of the strainer 71, the recess 71b being formed at the front of the lower surface of the strainer 71. In addition, a distance t1 between the lowermost part of the temperature detector 80b of the oil sensor 80 and the bottom wall 103 of the reservoir, and a distance t2 between the lowermost part of the inlet port 71a and the bottom wall 103 of the reservoir are approximately equal.

The inlet port 71a and the temperature detector 80b, when placed too close to the bottom wall 103, may interfere with the bottom wall 103, may have deteriorated suction performance due to an increased resistance, or are likely to be affected by the temperature of the bottom wall 103. On the other hand, the inlet port 71a and the temperature detector 80b, when placed too far from the bottom wall 103, are more likely to be exposed above the oil surface. However, by previously mounting the oil sensor 80 and the strainer 71 on the lid member 72, relative positional displacement of these components with respect to the bottom wall 103 is not likely to occur, and thus the components can be disposed at appropriate positions.

In this manner, in the lid member 72, the oil sensor 80 is fixed to the outer side, and the strainer 71 is fixed to the inner side. The oil sensor 80 and the strainer 71 are disposed so as to be overlapped with each other when viewed in a vertical direction and to be overlapped with each other when viewed in a horizontal directional. As illustrated in FIG. 7, the strainers 71 and the oil sensor 80 are formed to be within an outline projection area when viewed in the fore-and-aft direction, the outline projection area being a projection image of the case fixing portion 72a of the lid member 72.

As illustrated in FIG. 11, the inlet port 71a of the strainer 71 is located at a position which is closer to the middle of the reservoir than the oil sensor 80 when viewed in a vertical direction. In contrast to the periphery of the reservoir, the middle of the reservoir has a relatively small change of the oil surface, and thus disposing the strainer 71 near the middle prevents inclusion of air. Because it is not preferable that the oil sensor 80 is exposed above the oil surface, the oil sensor 80 is disposed in the vicinity of the bottom wall 103, and the oil sensor 80 has higher resistance to the exposure than the inlet port 71a.

As illustrated in FIG. 5, the flange 88 is mounted to be in contact with the pedestal part 87 on the outer side of the lid member 72 via a plurality of bolts 145, so that the electric oil pump 70 is located forward of the lid member 72. In addition, the case fixing portion 72a formed in the lid member 72, and the lid member fixing portion 105b formed in the front opening 105a of the strainer housing chamber 105 are mounted to each other via a plurality of bolts 106, and thus the electric oil pump 70 is mounted forward of the strainer housing chamber 105. As illustrated in FIG. 11, the outermost end (front end) of the pedestal part 87 is located at approximately the same position as the outermost end of the sensor base 80a in a mounted state. The outermost end of the pedestal part 87 may be located outwardly (forwardly) of the outermost end of the sensor base 80a in a mounted state. By extending the pedestal part 87 forwardly, the pedestal part 87 covers the top of the oil sensor 80.

The lower end of the flange 88 of the electric oil pump 70 fixed to the pedestal part 87 is located under the upper end of the sensor base 80a, and the flange 88 covers the front upper portion of the sensor base 80a in a mounted state where the electric oil pump 70 is mounted on the case 11. The lower end of a pump case 91 of the electric oil pump 70 is also located under the upper end of the sensor base 80a, and the pump case 91 covers the front upper portion of the sensor base 80a.

In addition, a sensor cover 130, which covers the front and lower portions of the sensor base 80a, is mounted on the case 11 via a bolt 140. As illustrated in FIGS. 11 to 14, the sensor cover 130 extends upward, so that a front wall 131 is overlapped with the flange 88 when viewed in a horizontal direction. The sensor cover 130 is disposed outwardly (forwardly) of the flange 88, inwardly (rearwardly) of the pump case 91, and is formed to bend rearwardly, so that a bottom wall 132 is substantially perpendicular to the front wall 131. In the bottom wall 132 which covers the lower portion of the sensor base 80a, a notch 133 is formed in order to avoid interference with a closing bolt for pressure detection 141 for closing a line pressure detection hole 98, the closing bolt for pressure detection 141 being located under the pedestal part 87. Consequently, the closing bolt for pressure detection 141 can be loosened or tightened with the electric oil pump 70 and the sensor cover 130 mounted when a pressure is detected. In the sensor cover 130, a recessed groove 135 for holding a sensor cable 80c is formed in a side wall 134 which intersects perpendicularly to the front wall 131 and the bottom wall 132. A protection plate 136 is provided to extend from the side wall 134 under the sensor cable 80c held in the recessed groove 135. In addition, a fixing plate 138 is provided standing from the side wall 134, the fixing plate 138 being provided with a bolt hole 137 into which the bolt 140 for mounting the sensor cover 130 is inserted.

Figure 10:
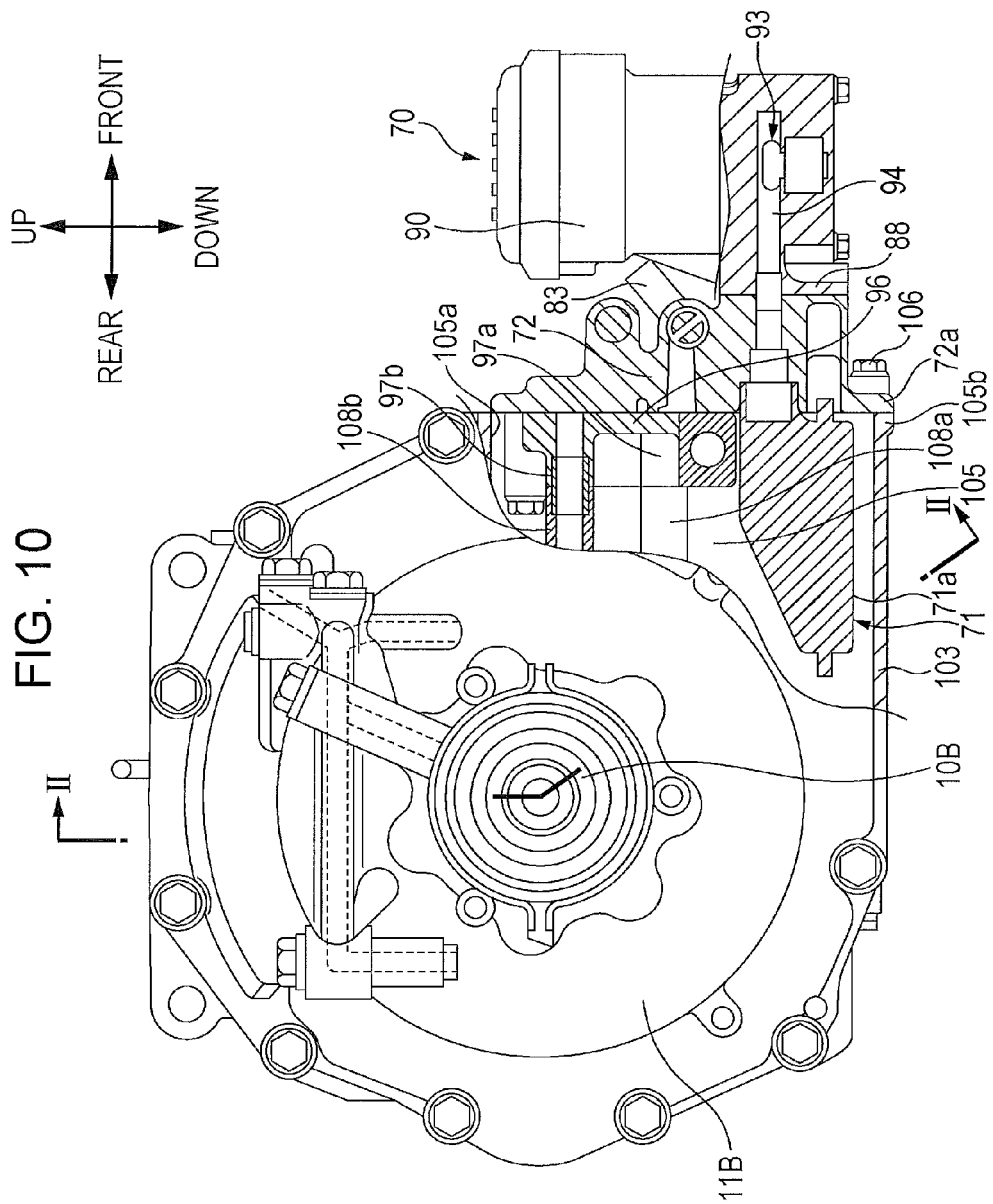
FIG. 10 is a partial cross-sectional view of the rear wheel drive device, taken along a vertical plane through an oil inlet path.

Returning to FIGS. 6 and 7, on the inner side of the lid member 72, an oil passage formation cover 96 which defines part of the oil passage, along with the lid member 72 are fixed via a bolt 69, the part of oil passage being communicated with the electric oil pump 70 of the below-described hydraulic circuit 99. Between the lid member 72 and the oil passage formation cover 96, there are disposed the below-described low-pressure oil passage switching valve 73, brake oil passage switching valve 74, and relief valve 84 from the bottom to the top. As illustrated in FIG. 10, a solenoid valve 83 is mounted on the side opposite to the oil passage formation cover 96 with respect to the lid member 72, and the below-described pilot oil passage 81, which is provided between the low-pressure oil passage switching valve 73 and the brake oil passage switching valve 74, is opened or blocked by flow of a current.

The electric oil pump 70 is what is called a trochoid pump, which is driven by an electric motor 90 including a position sensorless brushless DC motor. The electric oil pump 70 can be operated in at least two modes: high pressure mode and low pressure mode, and is controlled by PID control. Oil which flows from the strainer 71 into the electric oil pump 70 and the oil suction passage 94 provided in the lid member 72 is discharged into the electric oil pump 70 and the oil discharge passage 95 provided in the lid member 72 while adjusting the amount of discharge by rotating an inner rotor or an outer rotor (not illustrated) provided in a suction unit 93 illustrated in FIG. 8.

As illustrated in FIGS. 6, 7 and 10, two outlet pipes 97a, 97b are mounted on the oil passage formation cover 96, the outlet pipes 97a, 97b being respectively connected to a port for operation chamber 108a of the below-described brake oil passage 77 and a port for cooling/lubrication 108b which are formed in the outer circumferential surface of the central case 11M in the strainer housing chamber 105, the port for cooling/lubrication 108b serving for the first and second electric motors 2A, 2B, and the first and second planetary gear speed reducers 12A, 12B.

As described above, the outlet pipes 97a, 97b are respectively connected to the port for operation chamber 108a and the port for cooling/lubrication 108b in a mounted state where the lid member 72 equipped with the electric oil pump 70 is mounted on the front opening 105a of the strainer housing chamber 105. At the same time, the front opening 105a, which is formed at a position overlapping with the reservoir of the strainer housing chamber 105, is closed by the lid member 72, and the inner wall surface of the lid member 72 including the oil passage formation cover 96 constitutes the wall surface of the strainer housing chamber 105.

In the case 11, there are formed the brake oil passage 77 (see FIG. 15), which communicates between the port for operation chamber 108a and the operation chamber S; a front vertical oil passage 109 which extends from the port for cooling/lubrication 108b in a vertical direction at the front part of the central case 11M; and front horizontal oil passages 110A, 110B which branch out to the right and left from the front vertical oil passage 109, and extend horizontally in front of the cases 11A, 11B, 11M, thereby supplying oil to the first and second electric motors 2A, 2B and to the first and second planetary gear speed reducers 12A, 12B through the inside of axles 10A, 10B.

Figure 15:
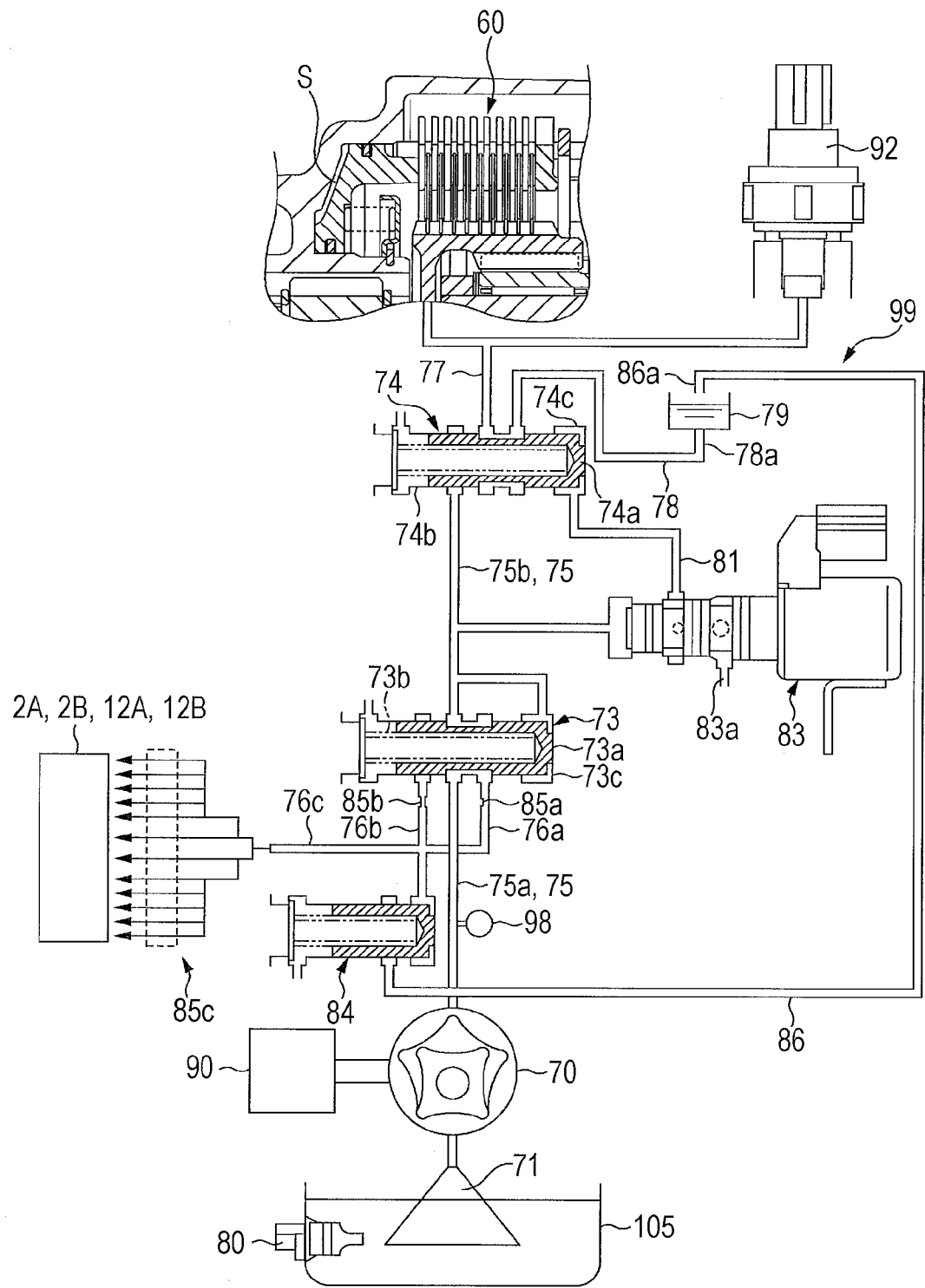
FIG. 15 is a diagram of a hydraulic circuit for cooling and/or lubricating an electric motor of the rear wheel drive device.

Next, a hydraulic circuit 99 will be described with reference to FIG. 15, the hydraulic circuit 99 being configured to cool and/or lubricate the first and second electric motors 2A, 2B described above, and to lubricate the first and second planetary gear speed reducers 12A, 12B.

The hydraulic circuit 99 is configured to supply oil to the operation chamber S of the hydraulic brake 60 via the low-pressure oil passage switching valve 73 and the brake oil passage switching valve 74, the oil being sucked from the strainer 71 which is disposed in the strainer housing chamber 1051 and being discharged from the electric oil pump 70, the oil being supplied, via the low-pressure oil passage switching valve 73, to a portion of the first and second electric motors 2A, 2B and the first and second planetary gear speed reducers 12A, 12B, the portion (hereinafter referred to as a lubrication/cooling target portion) needing to be lubricated or cooled. The hydraulic circuit 99 is provided with a sensor 92 which detects an oil pressure and the like of the brake oil passage 77.

The low-pressure oil passage switching valve 73 is connected to a first line oil passage 75a near the electric oil pump 70 included in a line oil passage 75, a second line oil passage 75b near the brake oil passage switching valve 74 included in the line oil passage 75, a first low-pressure oil passage 76a which communicates with the lubrication/cooling target portion, and a second low-pressure oil passage 76b which communicates with the lubrication/cooling target portion. The low-pressure oil passage switching valve 73 includes a valve element 73a, a spring 73b, and an oil chamber 73c, the valve element 73a being configured to constantly communicate with the first line oil passage 75a and the second line oil passage 75b and to allow the line oil passage 75 to selectively communicate with the first low-pressure oil passage 76a or the second low-pressure oil passage 76b, the spring 73b being configured to urge the valve element 73a in a direction (the right direction in FIG. 15) which allows the line oil passage 75 and the first low-pressure oil passage 76a to communicate with each other, the oil chamber 73c being configured to press the valve element 73a by the oil pressure of the line oil passage 75 in a direction (the left direction in FIG. 15) which allows the line oil passage 75 and the second low-pressure oil passage 76b to communicate with each other. Consequently, the valve element 73a is urged by the spring 73b in a direction (the right direction in FIG. 15) which allows the line oil passage 75 and the first low-pressure oil passage 76a to communicate with each other. The oil pressure of the line oil passage 75 inputted to the oil chamber 73c at the right end in FIG. 15 presses the valve element 73a in a direction (the left direction in FIG. 15) which allows the line oil passage 75 and the second low-pressure oil passage 76b to communicate with each other.

The urging force of the spring 73b is set such that the valve element 73a is not moved by the oil pressure of the line oil passage 75 inputted to the oil chamber 73c during the operation of the electric oil pump 70 in low-pressure mode, and the line oil passage 75 is blocked from the second low-pressure oil passage 76b and is opened to the first low-pressure oil passage 76a (hereinafter, the position of the above valve element 73a is referred to as a low-pressure side position), whereas the valve element 73a is moved by the oil pressure of the line oil passage 75 inputted to the oil chamber 73c during the operation of the electric oil pump 70 in high-pressure mode, and the line oil passage 75 is blocked from the first low-pressure oil passage 76a and is opened to the second low-pressure oil passage 76b (hereinafter, the position of the above valve element 73a is referred to as a high-pressure side position).

The brake oil passage switching valve 74 is connected to the second line oil passage 75b included in the line oil passage 75, the brake oil passage 77 connected to the hydraulic brake 60, and an oil reservoir 79 via a high position drain 78. The brake oil passage switching valve 74 includes a valve element 74a which allows the second line oil passage 75b and the brake oil passage 77 to be communicated with or blocked from each other, a spring 74b which urges the valve element 74a in a direction (the right direction in FIG. 15) which blocks the second line oil passage 75b and the brake oil passage 77 from each other, and an oil chamber 74c which presses the valve element 74a by the oil pressure of the line oil passage 75 in a direction (the left direction in FIG. 15) which allows the second line oil passage 75b and the brake oil passage 77 to communicate with each other. Consequently, the valve element 74a is urged by the spring 74b in a direction (the right direction in FIG. 15) which blocks the second line oil passage 75b and the brake oil passage 77 from with each other. The oil pressure of the line oil passage 75 inputted to the oil chamber 74c presses the valve element 74a in a direction (the left direction in FIG. 15) which allows the second line oil passage 75b and the brake oil passage 77 to communicate with each other.

The urging force of the spring 74b is set such that the valve element 74a is moved from a closed valve position to an open valve position by the oil pressure of the line oil passage 75 inputted to the oil chamber 74c during the operation of the electric oil pump 70 in low-pressure mode and high-pressure mode, and the brake oil passage 77 is blocked from the high position drain 78, and is made to communicate with the second line oil passage 75b. That is to say, even when the electric oil pump 70 is operated in low-pressure mode or high-pressure mode, the oil pressure of the line oil passage 75 inputted to the oil chamber 74c exceeds the urging force of the spring 74b, and thus the brake oil passage 77 is blocked from the high position drain 78 and is made to communicate with the second line oil passage 75b.

The hydraulic brake 60 is communicated with the oil reservoir 79 via the brake oil passage 77 and the high position drain 78 with the second line oil passage 75b and the brake oil passage 77 blocked from each other. Here, the oil reservoir part 79 is preferably disposed at a position higher than the strainer housing chamber 105 in a vertical direction. More preferably, the oil reservoir part 79 is disposed such that the uppermost part of the oil reservoir 79 in a vertical direction is located at a position higher than the midpoint between the uppermost part and the lowermost part of the operation chamber S of the hydraulic brake 60 in a vertical direction. Consequently, when the brake oil passage switching valve 74 is closed, the oil stored in the operation chamber S of the hydraulic brake 60 is not directly discharged to the strainer housing chamber 105, but is discharged to the oil reservoir 79 and stored therein. Oil overflowing from the oil reservoir 79 is discharged to the strainer housing chamber 105. A reservoir side end 78a of the high position drain 78 is connected to the bottom surface of the oil reservoir 79.

The oil chamber 74c of the brake oil passage switching valve 74 may be connected to the second line oil passage 75b included in the line oil passage 75 via the pilot oil passage 81 and the solenoid valve 83. The solenoid valve 83 includes an electromagnetic three-way valve controlled by an ECU (not illustrated). When the solenoid valve 83 is not energized by the ECU, the second line oil passage 75b is connected to the pilot oil passage 81, and the oil pressure of the line oil passage 75 is inputted to the oil chamber 74c.

When the solenoid valve 83 is in an energized state, the oil stored in the oil chamber 74c is discharged to the strainer housing chamber 105 via a discharge oil passage 83a, and the second line oil passage 75b and the pilot oil passage 81 are blocked from each other.

In the hydraulic circuit 99, the first low-pressure oil passage 76a merges with the second low-pressure oil passage 76b downstream to form a low-pressure common oil passage 76c in common. A relief valve 84 is connected to the merging point, the relief valve 84 being configured to allow the oil in the low-pressure common oil passage 76c to be discharged to the oil reservoir 79 via a relief drain 86 to reduce the oil pressure when the line pressure of the low-pressure common oil passage 76c is higher than or equal to a predetermined pressure. An oil reservoir side end 86a of the relief drain 86 is disposed at a position higher than the uppermost part of the oil reservoir 79 in a vertical direction.

Here, in the first low-pressure oil passage 76a and the second low-pressure oil passage 76b, orifices 85a and 85b are formed as passage resistance units, respectively, and the diameter of the orifice 85a of the first low-pressure oil passage 76a is greater than the diameter of the orifice 85b of the second low-pressure oil passage 76b. Therefore, the flow passage resistance of the second low-pressure oil passage 76b is greater than the flow passage resistance of the first low-pressure oil passage 76a, and thus reduced amount of pressure in the second low-pressure oil passage 76b during the operation of the electric oil pump 70 in high-pressure mode is greater than reduced amount of pressure in the first low-pressure oil passage 76a during the operation of the electric oil pump 70 in low-pressure mode. Consequently, the oil pressures of the low-pressure common oil passage 76c in high-pressure mode and low-pressure mode are approximately equal.

In this manner, in the low-pressure oil passage switching valve 73 connected to the first low-pressure oil passage 76a and the second low-pressure oil passage 76b, the urging force of the spring 73b is greater than the oil pressure in the oil chamber 73c during the operation of the electric oil pump 70 in low-pressure mode, and thus the valve element 73a is located at a low-pressure side position due to the urging force of the spring 73b, thereby causing the line oil passage 75 to be blocked from the second low-pressure oil passage 76b and allowing the line oil passage 75 to communicate with the first low-pressure oil passage 76a. The oil which flows through the first low-pressure oil passage 76a is reduced in pressure because a flow passage resistance is applied to the oil via the orifice 85a, and the oil reaches the lubrication/cooling target portion through the low-pressure common oil passage 76c. On the other hand, the oil pressure in the oil chamber 73c is greater than the urging force of the spring 73b during the operation of the electric oil pump 70 in high-pressure mode, and thus the valve element 73a is located at a high-pressure side position against the urging force of the spring 73b, thereby causing the line oil passage 75 to be blocked from the first low-pressure oil passage 76a and allowing the line oil passage 75 to communicate with the second low-pressure oil passage 76b. The oil which flows through the second low-pressure oil passage 76b is reduced in pressure because a flow passage resistance greater than another flow passage resistance via the orifice 85a is applied to the oil via the orifice 85b, and the oil reaches the lubrication/cooling target portion through the low-pressure common oil passage 76c.

Thus, when the electric oil pump 70 is switched from low-pressure mode to high-pressure mode, active oil passage is automatically switched from an oil passage having a smaller flow passage resistance to an oil passage having a greater flow passage resistance according to a change of the oil pressure of the line oil passage 75, and thus excessive oil supply to the lubrication/cooling target portion is prevented in high-pressure mode.

A plurality of orifices 85c are provided as other flow passage resistance unit on an oil passage from the low-pressure common oil passage 76c to the lubrication/cooling target portion. The plurality of orifices 85c are set such that the minimum flow passage cross-sectional area of the orifice 85a of the first low-pressure oil passage 76a is smaller than the minimum flow passage cross-sectional area of the plurality of orifices 85c. That is to say, the flow passage resistance of the orifice 85a of the first low-pressure oil passage 76a is set to be greater than the flow passage resistance of the plurality of orifices 85c. In the above, the minimum flow passage cross-sectional area of the plurality of orifices 85c is the total of the minimum flow passage cross-sectional areas of the orifices 85c. Thus, a desired amount of flow can be adjusted by the orifice 85a of the first low-pressure oil passage 76a and the orifice 85b of the second low-pressure oil passage 76b is attained.

The line oil passage 75 is provided with the line pressure detection hole 98 between the electric oil pump 70 and the low-pressure oil passage switching valve 73, the line pressure detection hole 98 being closed by the above-mentioned closing bolt for pressure detection 141. By removing the closing bolt for pressure detection 141 through the notch 133 of the sensor cover 130, the oil pressure of the first line oil passage 75a can be detected with the electric oil pump 70 and the sensor cover 130 mounted.

As described above, in the rear wheel drive device 1 in the present embodiment, the oil sensor 80 for detecting an oil temperature is disposed in the first right-and-left communication passage FP which communicates with the left reservoir RL and the right reservoir RR, and thus the temperature of oil in a state where the oil on the right and left is further mixed, i.e., the oil is equalized can be detected. In the above-described embodiment, the strainer housing chamber 105 included in the first right-and-left communication passage FP is provided with the oil sensor 80, however, the oil sensor 80 is not necessarily provided in the strainer housing chamber 105, and may be provided in other space included in the right-and-left communication passages. In the above embodiment, oil is used as liquid fluid for cooling and lubricating, however, other liquid fluid may be used. The oil sensor 80 for detecting an oil temperature has been illustrated as the sensor for detecting the properties of liquid fluid. Without being limited to this configuration, however, an oil sensor which detects oil viscosity, oil deterioration, and an oil level may be used.

The left reservoir RL and the right reservoir RR in the case 11 are arranged in the vehicle width direction, and thus flow between the left reservoir RL and the right reservoir RR, i.e., flow of the first right-and-left communication passage FP is promoted by generation of centrifugal force caused by turning, and consequently the oil in the left reservoir RL and the right reservoir RR is further mixed.

The oil sensor 80 is disposed in approximately the middle of the right-and-left communication passage FP in the vehicle width direction, and thus the temperature of further equalized oil can be detected.

The inlet port 71a, which is communicated with the electric oil pump 70 for supplying oil, is disposed in the right-and-left communication passage FP, and thus a flow occurs from the left reservoir RL and the right reservoir RR to the first right-and-left communication passage FP, and consequently the oil in the left reservoir RL and the right reservoir RR is further mixed.

The oil sensor 80 and the inlet port 71a are arranged close to each other, and thus the temperature of oil can be detected at a position where much oil gathers, i.e., a position where much fluid flows and mixture of the fluid is promoted.

The right-and-left communication passage FP has the strainer housing chamber 105 in which the strainer 71 having the inlet port 71a is disposed, and the temperature detector 80b of the oil sensor 80 is disposed in the strainer housing chamber 105, and thus the degree of freedom of arrangement of the oil sensor 80 can be increased.

The case 11 further includes the second right-and-left communication passage SP which is formed in parallel with the first right-and-left communication passage FP and communicates with the left reservoir RL and the right reservoir RR, and thus the oil in the left reservoir RL and the right reservoir RR is further mixed. A right-and-left communication passage may be formed in the case 11 in addition to the first right-and-left communication passage FP and the second right-and-left communication passage SP.

The oil sensor 80 is disposed only in the first right-and-left communication passage FP out of the left reservoir RL, the right reservoir RR, and the first right-and-left communication passage FP, and thus the temperature of oil can detected by a single oil sensor 80, and the number of components can be reduced and the assembly steps can be simplified. The present disclosure does not exclude a configuration in which one or more oil sensors 80 are provided.

The present disclosure is not limited to the embodiment described above, and modification, improvement may be made as necessary. For example, the front wheel drive device 6 may use the electric motor 5 as the only source of drive without using the internal combustion engine 4. Although an electric motor has been illustrated as a motor, however, a thermomotor such as an engine or a fluid machine may be used without being limited to an electric motor. Other transmission different from the first and second planetary gear speed reducers 12A, 12B may be employed, and a configuration may be adopted in which a motor and wheels are directly connected without including transmission.

In the present embodiment, the left lateral case 11A and the central case 11M constitute the first case 11L, and the right lateral case 11B and the central case 11M constitute the second case 11R. However, the configuration is not limited to the above as long as the first case 11L in the present disclosure houses the first electric motor 2A and has the left reservoir RL, and the second case 11R houses the second electric motor 2B and has the right reservoir RR.

In the present embodiment, the oil sensor 80 is inserted into the first right-and-left communication passage FP from a front position. Without being limited to this configuration, a configuration may be adopted in which the oil sensor 80 is inserted into the first right-and-left communication passage FP from a rear position or a lateral position, or from an upper position or a lower position. However, insertion from a lower position may be avoided, so that when maintenance or assembly of the drive device for vehicle 1 is performed, the bottom surface of the drive device for vehicle 1 may be used as the base for temporary placement.

A drive device for a vehicle (for example, a rear wheel drive device 1 of the embodiment) according to a first aspect of the embodiment includes: a first motor (for example, a first electric motor 2A of the embodiment) connected to a left wheel of the vehicle (for example, a left rear wheel LWr of the embodiment) in a power transmissible manner; a first case (for example, a first case 11L of the embodiment) which houses the first motor and has a left reservoir (for example, a left reservoir RL of the embodiment) for storing liquid fluid provided for at least one of cooling of the first motor, lubrication of the first motor, cooling of a power transmission path between the first motor and the left wheel, and lubrication of the power transmission path between the first motor and the left wheel; a second motor (for example, a second electric motor 2B of the embodiment) connected to a right wheel (for example, a right rear wheel RWr of the embodiment) of the vehicle in a power transmissible manner; a second case (for example, a second case 11R of the embodiment) which houses the second motor and has a right reservoir (for example, a right reservoir RR of the embodiment) for storing liquid fluid provided for at least one of cooling of the second motor, lubrication of the second motor, cooling of a power transmission path between the second motor and the right wheel, and lubrication of the power transmission path between the second motor and the right wheel; and a right-and-left communication passage (for example, a first right-and-left communication passage FP of the embodiment) which communicates with the left reservoir and the right reservoir. A sensor (for example, an oil sensor 80 of the embodiment) which detects the properties of the liquid fluid is disposed in the right-and-left communication passage. Thus, a single sensor can be disposed in the right-and-left communication passage, and consequently the properties of oil in a state where liquid fluids on the right and left are further mixed, i.e., the properties of further equalized state of oil can be detected.

In addition to the configuration according to the first aspect of the embodiment, the drive device for a vehicle according to a second aspect of the embodiment has a configuration in which the left reservoir and the right reservoir are arranged in a width direction of the vehicle. Thus, flow between the left reservoir and the right reservoir, i.e., flow through the rightand-left communication passage is promoted by generation of centrifugal force caused by turning, and consequently the liquid fluids on the right and left are further mixed.

In addition to the configuration according to the second aspect of the embodiment, the drive device for a vehicle according to a third aspect of the embodiment has a configuration in which the sensor is disposed in approximately the middle of the right-and-left communication passage in the vehicle width direction. Thus, the properties of further equalized oil can be detected.

In addition to the configuration according to any one of the first to third aspects of the embodiment, the drive device for a vehicle according to a fourth aspect of the embodiment has a configuration in which an inlet port (for example, an inlet port 71a of the embodiment) is disposed in the right-and-left communication passage, the inlet port being communicated with a liquid fluid supply device which supplies the liquid fluid. Thus, a flow occurs from the left reservoir and the right reservoir to the right-and-left communication passage, and consequently the liquid fluids on the right and left are further mixed.

In addition to the configuration according to the fourth aspect of the embodiment, the drive device for a vehicle according to a fifth aspect of the embodiment has a configuration in which the sensor and the inlet port are arranged close to each other. Thus, the properties of liquid fluid can be detected at a position where much liquid fluid gathers, i.e., a position where much liquid fluid flows and mixture of the liquid fluid is promoted.

In addition to the configuration according to the fifth aspect of the embodiment, the drive device for a vehicle according to a sixth aspect of the embodiment has a configuration in which the right-and-left communication passage has a capacity chamber (for example, a strainer housing chamber 105 of the embodiment) in which a strainer (for example, a strainer 71 of the embodiment) having the inlet port is disposed, and a detection unit (for example, a temperature detector 80b of the embodiment) of the sensor is disposed in the capacity chamber. Thus, the degree of freedom of arrangement of the liquid state fluid sensor can be increased.

In addition to the configuration according to any one of the first to sixth aspects of the embodiment, the drive device for a vehicle according to a seventh aspect of the embodiment further includes a right-and-left communication passage (for example, a second right-and-left communication passage SP of the embodiment) which is formed in parallel with the right-and-left communication passage and configured to communicate with the left reservoir and the right reservoir. Thus, liquid fluids on the right and left are further mixed.

In addition to the configuration according to any one of the first to seventh aspects of the embodiment, the drive device for a vehicle according to an eighth aspect of the embodiment has a configuration in which the sensor is disposed only in the right-and-left communication passage out of the left reservoir, the right reservoir, and the right-and-left communication passage. Thus, the left reservoir and the right reservoir do not need to be provided with respective sensors, but a single sensor can detect the properties of liquid fluid, and consequently the number of components can be reduced and the assembly steps can be simplified.

In addition to the configuration according to any one of the first to eighth aspects of the embodiment, the drive device for a vehicle according to a ninth aspect of the embodiment has a configuration in which the sensor is configured to detect a temperature of the liquid fluid. Thus, the temperature of liquid fluid can be detected, in which the liquid fluids of the left reservoir and the right reservoir are mixed and equalized.

Obviously, numerous modifications and variations of the present invention are possible in light of the above teachings. It is therefore to be understood that within the scope of the appended claims, the invention may be practiced otherwise than as specifically described herein.

What is claimed is:

1. A drive device for a vehicle, comprising:
   a first motor connected to a left wheel of the vehicle to drive the left wheel;
   a first case which houses the first motor and which has a left reservoir to store liquid fluid used for at least one of cooling of the first motor, lubrication of the first motor, cooling of a power transmission path between the first motor and the left wheel, and lubrication of the power transmission path between the first motor and the left wheel;
   a second motor connected to a right wheel of the vehicle to drive the right wheel;
   a second case which houses the second motor and which has a right reservoir to store liquid fluid used for at least one of cooling of the second motor, lubrication of the second motor, cooling of a power transmission path between the second motor and the right wheel, and lubrication of the power transmission path between the second motor and the right wheel;
   a third case disposed so as to be interposed between the first case and the second case and including a right-and-left communication passage which communicates with the left reservoir and the right reservoir; and
   a sensor configured to detect a property of the liquid fluid and disposed in the right-and-left communication passage,
   wherein the left reservoir and the right reservoir are arranged in a vehicle width direction of the vehicle, and
   wherein an inlet port which communicates with a liquid fluid supply device to supply the liquid fluid is disposed in the right-and-left communication passage.

2. The drive device for a vehicle according to claim 1, wherein the sensor is disposed only in the right-and-left communication passage out of the left reservoir, the right reservoir, and the right-and-left communication passage.

3. The drive device for a vehicle according to claim 1, wherein the third case includes an additional right-and-left communication passage which is formed in parallel with the right-and-left communication passage and provided to communicate with the left reservoir and the right reservoir.

4. The drive device for a vehicle according to claim 1, wherein the sensor and the inlet port are arranged in a vicinity of each other.

5. The drive device for a vehicle according to claim 4, wherein the right-and-left communication passage has a capacity chamber in which a strainer having the inlet port is disposed, and
   wherein the sensor includes a detector disposed in the capacity chamber.

6. The drive device for a vehicle according to claim 1, wherein the sensor is configured to detect a temperature of the liquid fluid.

7. The drive device for a vehicle according to claim 1, wherein the right-and-left communication passage is provided between the left reservoir and the right reservoir in a vehicle width direction of the vehicle.

8. The drive device for a vehicle according to claim 1, further comprising:

a first speed reducer cooled by the liquid fluid; and a second speed reducer cooled by the liquid fluid, wherein the first speed reducer is disposed in the first case and between the first motor and the second motor, and wherein the second speed reducer is disposed in the second case and between the first motor and the second motor.

9. The drive device for a vehicle according to claim 8, wherein the right-and-left communication passage is configured to communicate with the left reservoir and the right reservoir, the liquid fluid being supplied to the first motor, the second motor, the first speed reducer and the second speed reducer.

\* \* \* \* \*